(12) United States Patent
Dempo

(10) Patent No.: US 6,321,088 B1
(45) Date of Patent: Nov. 20, 2001

(54) HAND-OVER PROCESSING METHOD IN WHICH AMOUNT OF CONTROL INFORMATION BETWEEN TERMINAL AND SATELLITE CAN BE REDUCED AND HAND-OVER PROCESSING SYSTEM OF THE SAME

(75) Inventor: Hiroshi Dempo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/613,593

(22) Filed: Jul. 10, 2000

(30) Foreign Application Priority Data

Jul. 8, 1999 (JP) .................................................. 11-195008

(51) Int. Cl.$^7$ ...................................................... H04Q 7/20
(52) U.S. Cl. ........................... 455/436; 455/428; 455/427; 455/13.1; 455/440; 370/331; 370/333; 370/334
(58) Field of Search ................................... 455/13.1, 427, 455/428, 436, 440, 429; 370/331, 332, 333, 334

(56) References Cited

U.S. PATENT DOCUMENTS

| | | | | |
|---|---|---|---|---|
| 5,363,110 | * | 11/1994 | Inamiya | 342/357 |
| 5,483,664 | * | 1/1996 | Moritz et al. | 455/13.1 |
| 5,561,838 | * | 10/1996 | Chandos et al. | 455/13.1 |
| 5,574,968 | * | 11/1996 | Olds et al. | 455/12.1 |
| 5,708,963 | * | 1/1998 | Mobley et al. | 455/12.1 |
| 5,815,809 | * | 9/1998 | Ward et al. | 455/428 |
| 5,850,602 | * | 12/1998 | Tisdale et al. | 455/430 |
| 6,160,993 | * | 12/2000 | Wilson | 455/12.1 |

FOREIGN PATENT DOCUMENTS

| | | |
|---|---|---|
| 7-75156 | 3/1995 | (JP) . |
| 10-32532 | 2/1998 | (JP) . |
| 10-243440 | 9/1998 | (JP) . |

* cited by examiner

*Primary Examiner*—William Trost
*Assistant Examiner*—Marceau Milord
(74) *Attorney, Agent, or Firm*—Young & Thompson

(57) ABSTRACT

A hand-over processing method includes (a) providing a first satellite providing a communication service to a service area having a plurality of areas at a first time, (b) detecting, of the plurality of areas, an area as a specific area outside a service area to which the first satellite provides the communication service at a second time when a predetermined time elapsed after the first time, (c) detecting a second satellite providing the communication service to the specific area at the second time, (d) transmitting a hand-over request from the first satellite to perform a hand-over of the specific area to the second satellite, (e) judging whether or not the hand-over can be performed in response to the hand-over request to transmit the judging result to the first satellite and (f) performing the hand-over based on the judging result.

46 Claims, 19 Drawing Sheets

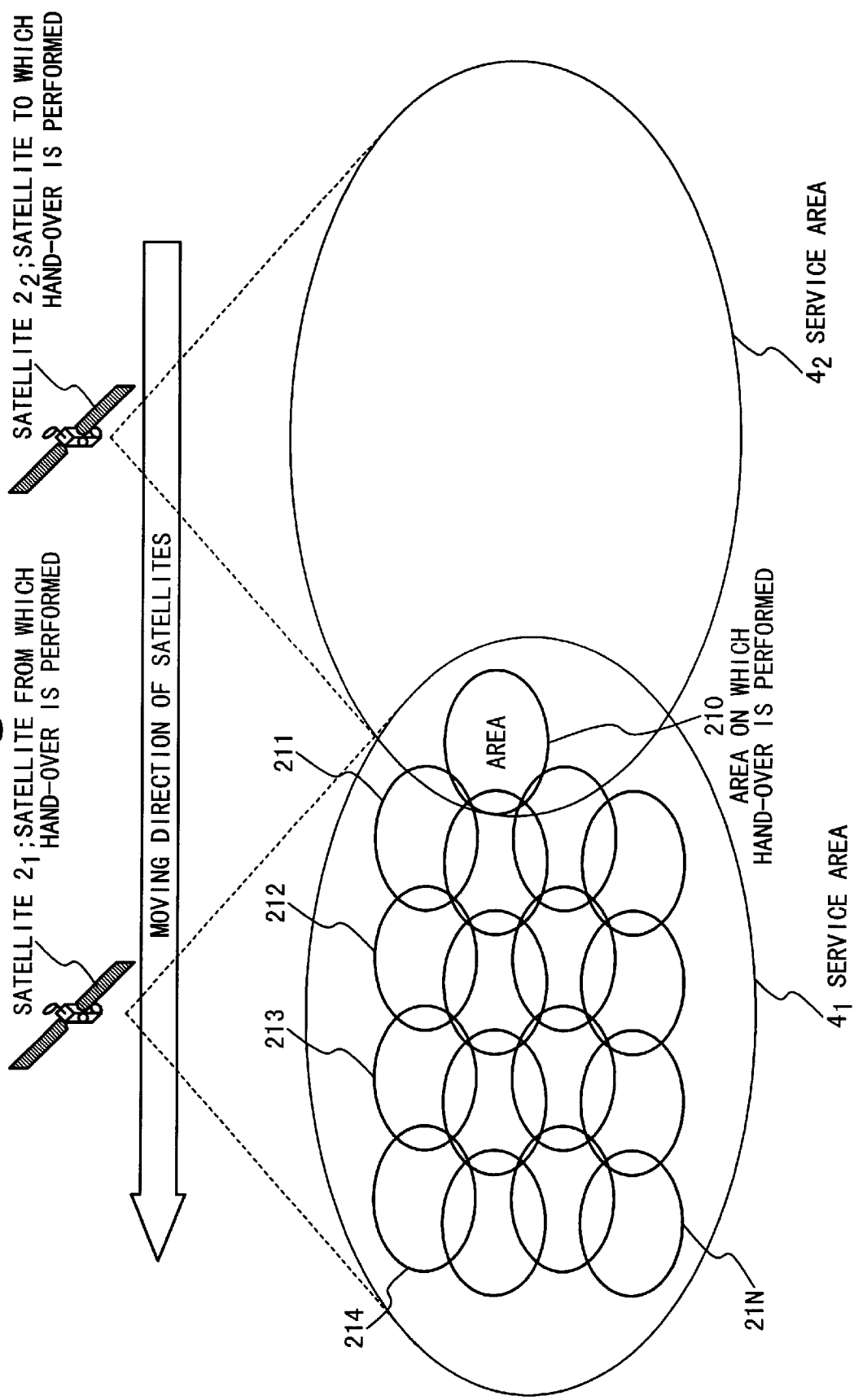

Fig. 3

| CONNECTION INFORMATION TABLE BETWEEN A TERMINAL AND A SATELLITE | | | | | | | | | |
|---|---|---|---|---|---|---|---|---|---|
| AREA NUMBER | RADIO COMMUNICATION IDENTIFYING INFORMATION | ATM-SW CONNECTION PORT | TERMINAL IDENTIFIER | | CONNECTION IDENTIFYING INFORMATION | RADIO CHANNEL NUMBER | CONNECTION INFORMATION BETWEEN A TERMINAL AND A SATELLITE | | |
| | | | TRANSMITTING SIDE | RECEIVING SIDE | | | VPI/VCI FOR USE | BAND | SERVICE TYPES |
| 200 | 1100 | 0 | 0000h | 5555h | 0000h | 00h | 10h/0010h | 10MBITS/s | CBR |
| | | | ...... | ...... | ...... | ...... | ...... | ...... | ...... |
| | | | ffffh | 6666h | ffffh | ffh | 10h/1110h | 10MBITS/s | VBR |
| ...... | ...... | ...... | ...... | ...... | ...... | ...... | ...... | ...... | ...... |
| 20N | 110N | N | 0100h | 7777h | 0100h | 00h | ffh/5abch | 10MBITS/s | UBR |
| | | | ...... | ...... | ...... | ...... | ...... | ...... | ...... |
| | | | ffffh | 8888h | ffffh | ffh | 11h/0021h | 10MBITS/s | CBR |

Fig. 4

CONNECTION INFOMATION TABLE BETWEEN A SATELLITE AND A SATELLITE

| RADIO COMMUNICATION IDENTIFYING INFORMATION | ATM-SW CONNECTION PORT | CONNECTION IDENTIFYING INFORMATION | CONNECTION INFORMATION BETWEEN A SATELLITE AND A SATELLITE | | | ROUTE INFORMATION BETWEEN SATELLITES (VARIABLE-LENGTH) | | | | |
|---|---|---|---|---|---|---|---|---|---|---|
| | | | VPI/VCI FOR USE | BAND | SERVICE TYPES | FIRST SATELLITE | | ...... | L-TH-SATELLITE (SATELLITE OVER RECEIVING TERMINAL) | |
| | | | | | | SATELLITE IDENTIFIER | COMMUNICATION IDENTIFIER | | SATELLITE IDENTIFIER | CONNECTION IDENTIFIER |
| 1200 | 0 | 0000h | 20h/0010h | 10MBITS/s | CBR | 0 | 0 | ...... | 0 | 0 |
| | | ...... | ...... | | | ...... | ...... | | ...... | ...... |
| | | ffffh | 30h/1110h | 10MBITS/s | VBR | 4 | 4 | ...... | 4 | 4 |
| ...... | | | | | | | | | | |
| 120M | N | 0000h | ffh/5555h | 10MBITS/s | UBR | 20 | 20 | ...... | 20 | 20 |
| | | ...... | | | | ...... | ...... | | ...... | ...... |
| | | ffffh | 13h/0021h | 10MBITS/s | CBR | 100 | 100 | ...... | 100 | 100 |

Fig. 5

ATM-SW TABLE

| ATM CONVERSION TABLE INFORMATION | | | | | | |
|---|---|---|---|---|---|---|
| SERVICE TYPES | INPUT PORT | VPI/VCI FOR INPUT | BAND | OUTPUT PORT | VPI/VCI FOR OUTPUT | BAND |
| CBR | 0 | 10h/0010h | 10MBITS/s | c | 20h/0010h | 10MBITS/s |
| ⋮ | ⋮ | ⋮ | ⋮ | ⋮ | ⋮ | ⋮ |
| VBR | 1 | 10h/1110h | 10MBITS/s | d | 30h/1110h | 10MBITS/s |
| ⋮ | ⋮ | ⋮ | ⋮ | ⋮ | ⋮ | ⋮ |
| UBR | 2 | ffh/5abch | 10MBITS/s | e | ffh/5555h | 10MBITS/s |
| ⋮ | ⋮ | ⋮ | ⋮ | ⋮ | ⋮ | ⋮ |
| CBR | 3 | 11h/0021h | 10MBITS/s | f | 13h/0021h | 10MBITS/s |

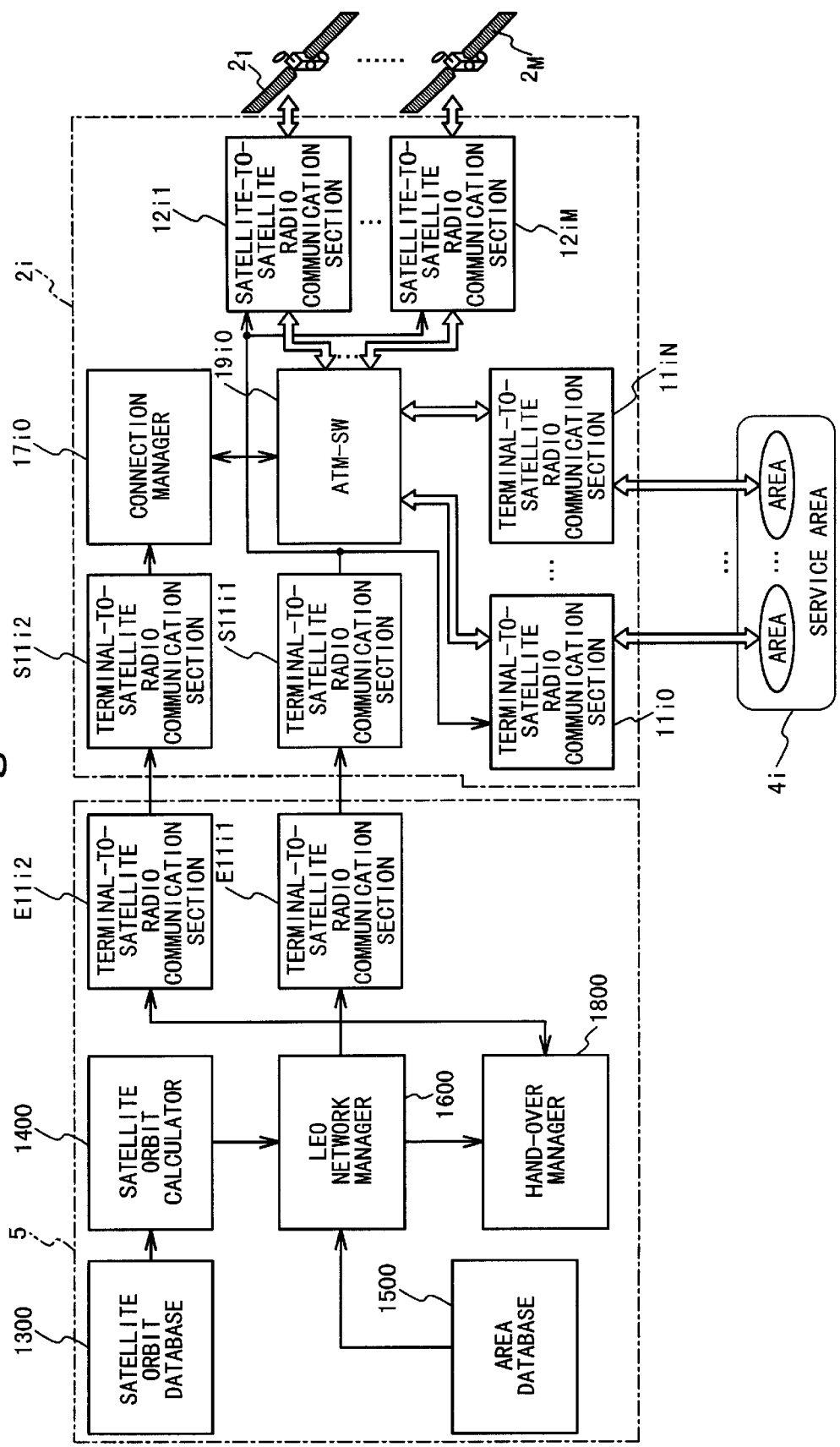

HAND-OVER PROCESSING METHOD IN WHICH AMOUNT OF CONTROL INFORMATION BETWEEN TERMINAL AND SATELLITE CAN BE REDUCED AND HAND-OVER PROCESSING SYSTEM OF THE SAME

BACKGROUND OF THE INVENTION

1. Field of the Invention

The present invention relates to a hand-over processing method, and a hand-over processing system. More particularly, the present invention relates to a hand-over processing method, in which a subsequent (following) satellite takes over a communication service to continue a communication service without interruption in a low-Earth-orbiting (LEO) network, and a system for attaining it.

2. Description of the Related Art

In a conventional ground-based mobile communication system, a base station and a switching system are mainly fixed and a mobile unit (terminal) moves. In this mobile communication system, a hand-over process (communication succession process) that must be inevitably done when the mobile unit moves from a certain communication service area to a communication service area adjacent to the certain communication service area, is started (initiated) by the mobile unit when the mobile unit begins to move from the certain area to the adjacent area.

In the ground-based mobile communication system, a moving direction of the mobile unit and a starting point of the hand-over process are usually random. Thus, it is rare that a timing point when a certain mobile unit starts the hand-over process is equal to timing points when all other mobile units within the area from which the certain mobile, unit moves start the hand-over process on a particular base station, respectively. In other words, a possibility that a plurality of mobile units (mobile unit group) under management of a certain base station must simultaneously perform the hand-over processes on a particular base station is extremely low.

This kind of hand-over process technique is noted in, for example, Japanese Laid Open Patent Application (JP-A-Heisei, 10-243440). This noted technique has a system configuration in which the hand-over process is started by the mobile unit or the terminal to the base station.

By the way, in the LEO network, a satellite itself having functions as a base station and a switching system moves at a high speed in the skies of the mobile unit and the fixed terminal along a predetermined orbit.

Thus, if an ROFA (Region Oriented Frequency Access) method is applied as a beam scanning method to the ground mobile units and terminals from the satellite, a certain satellite providing a communication service to mobile units and terminals within an area, after a certain time, flies away from the skies of the area, and after an elapse of a predetermined time, can again start providing the communication service to the mobile units and the terminals within the area. In this case, it is inevitably necessary to simultaneously perform the hand-over processes with regard to the mobile units and the terminals within the area, on a following satellite which orbits around the Earth in the same orbit as the orbit of the certain satellite and directly follows the certain satellite and flies over the skies of the area, for each timing point when the certain satellite can not provide the communication service to the area, namely, periodically. Then, the simultaneous hand-over processes must be done periodically and repeatedly within a short time, as mentioned above.

Thus, if the technique noted in the above mentioned gazette is merely applied to such an LEO network, the simultaneous hand-over processes must be done periodically for each short time.

Thus, an amount of control information on a radio link between the mobile units or the terminals and the satellite can not be avoided from being suddenly increased for each relatively short time.

Accordingly, an amount of information that can be transmitted on the radio link is expended on the amount of the control information, which not only drops a usage efficiency of the radio link but also increases a process delay caused by the sudden increase of the amount of the control information. This results in the reduction of the communication service.

Japanese Laid Open Patent Application (JP-A-Heisei, 7-75156) discloses a conventional technique as a cellular communication system. In this system, a cellular communication network includes a satellite throwing a cell on the earth. The satellite and the cell move with respect to the earth. A call is set up to a subscriber unit, the date indicating the position of the subscriber unit is transmitted to a exchange unit of the cellular communication network. The exchange unit generates a schedule in which an advance notice of a time when the subscriber unit passes over a boundary of the cell is given. While the call is in progress, the subscriber unit judges whether or not a cross of the pre-noticed boundary is generated. The call is handed-off to a predetermined cell as far as an appropriate signal exists in a planed cell and as far as a network capacity exists in the predetermined cell.

Japanese Laid Open Patent Application (JPA-Heisei, 10-32532) discloses a conventional technique as a method of performing a hand-off of communication between a first satellite system 500 and an alternate satellite system. In this method, a case that a hand-off condition exits with respect to the first satellite system is determined. An alternate satellite of which a coverage area is positioned such that the alternate satellite can provide an alternate communication link is determined. After that, the hand-off between the first satellite system and an alternate satellite system is performed. If the condition of the hand-off is eased, a re-hand-off to the first satellite system is performed, and the normal operation is started again.

SUMMARY OF THE INVENTION

The present invention has been made to solve the above-described problems of the conventional hand-over processing method. An object of the present invention is to provide the hand-over processing method in which a communication satellite of a hand-over source (a side for passing a service) starts the hand-over process to thereby enable the hand-over process to be carried out from the communication satellite to a communication satellite of a hand-over destination (a side responsible for the service), and a system for doing the same.

In order to achieve an aspect of the present invention, a hand-over processing method, includes: (a) providing a first satellite providing a communication service to a service area having a plurality of areas at a first time; (b) detecting, of the plurality of areas, an area as a specific area outside a service area to which the first satellite provides the communication service at a second time when a predetermined time elapsed after the first time; (c) detecting a second satellite providing the communication service to the specific area at the second time; (d) transmitting a hand-over request from the first satellite to perform a hand-over of the specific area to the second satellite; (e) judging whether or not the hand-over can be performed in response to the hand-over request to transmit the judging result to the first satellite; and (f) performing the hand-over based on the judging result.

In this case, wherein the (f) includes performing the hand-over at the second time.

Also in this case, wherein the specific area on which the hand-over is performed includes a plurality of connections of a plurality of terminals at the specific area, and wherein the hand-over is performed on the plurality of connections at a same time.

Further in this case, wherein the predetermined time corresponds to a time needed to perform the hand-over after the hand-over request is transmitted.

In this case, wherein the (b) and (c) steps include detecting the specific area and the second satellite respectively based on a first data indicating positions of the first and second satellites at the first time and a second data indicating positions of the first and second satellites at the second time.

Also in this case, wherein the (b) and (c) steps are performed at a ground station other than the first satellite.

Further in this case, wherein the second satellite includes a plurality of second beam emitting units, the plurality of second beam emitting units being able to emit beams to the plurality of areas respectively, and wherein the second satellite reserves one which is not used of the plurality of second beam emitting units when the hand-over request is transmitted to the second satellite, and wherein the reserved second beam emitting unit emits a beam to the specific area when the hand-over is performed.

In this case, wherein the first satellite includes a plurality of first beam emitting units, the plurality of first beam emitting units emitting beams to the plurality of areas respectively, and wherein the second satellite includes a plurality of second beam emitting units, the plurality of second beam emitting units being able to emit beams to the plurality of areas respectively.

Also in this case, wherein the first satellite has a first connection information with respect to a communication between the first satellite and a first terminal at the specific area, and wherein the second satellite uses the first connection information as a information with respect to a communication between the second satellite and the first terminal when the hand over is performed.

In order to achieve another aspect of the present invention, a hand-over processing method, includes: (g) providing a first satellite providing a communication service to a service area having a plurality of areas at a first time; (h) detecting, of the plurality of areas, an area as a specific area outside a service area to which the first satellite provides the communication service at a second time when a predetermined time elapsed after the first time; (i) detecting a second satellite providing the communication service to the specific area at the second time; (j) transmitting a hand-over request from the first satellite to perform a hand-over of the specific area to the second satellite, wherein the hand-over request includes a connection information with respect to a communication through the first satellite of a first terminal at the specific area; (k) setting a first connection information with respect to a communication between the first satellite and the first terminal to a information with respect to a communication between the second satellite and the first terminal provisionally, wherein the connection information includes the first connection information; (1) detecting a fourth satellite providing a communication service to a second terminal on the other end of the communication of the first terminal based on the connection information; (m) provisionally setting a second connection to perform a communication between the second satellite and the fourth satellite; (n) transmitting a provisional setting notification that the second connection is set provisionally to the second satellite; (o) judging the hand-over can be performed when the provisional setting notification is transmitted to transmit the judging result to the first satellite; and (p) performing the hand-over based on the judging result, wherein the hand-over is performed with using the first connection information and the second connection.

In order to still achieve another aspect of the present invention, a hand-over processing method, includes: (q) providing a first satellite providing a communication service to a service area having a plurality of areas at a first time; (r) detecting, of the plurality of areas, an area as a specific area outside a service area to which the first satellite provides the communication service at a second time when a predetermined time elapsed after the first time; (s) detecting a second satellite providing the communication service to the specific area at the second time; (t) transmitting a hand-over request from the first satellite to perform a hand-over of the specific area to the second satellite, wherein the hand-over request includes a connection information with respect to a communication through the first satellite of a first terminal at the specific area; (u) setting a first connection information with respect to a communication between the first satellite and the first terminal to a information with respect to a communication between the second satellite and the first terminal provisionally, wherein the connection information includes the first connection information; (v) detecting a fourth satellite providing a communication service to a second terminal on the other end of the communication of the first terminal based on the connection information; (w) detecting a third satellite positioned between the second satellite and the fourth satellite; (x) provisionally setting a first connection to perform a communication between the second satellite and the third satellite; (y) provisionally setting a second connection to perform a communication between the third satellite and the fourth satellite; (z) transmitting a provisional setting notification that the first and second connections are set provisionally to the second satellite; (aa) judging the hand-over can be performed when the provisional setting notification is transmitted to transmit the judging result to the first satellite; and (ab) performing the hand-over based on the judging result, wherein the hand-over is performed with using the first connection information and the first and second connections.

In order to achieve yet still another aspect of the present invention, a hand-over processing method, includes: (ac) providing a first satellite providing a communication service to a service area having a plurality of areas at a first time; (ad) detecting, of the plurality of areas, an area as a specific area outside a service area to which the first satellite provides the communication service at a second time when a predetermined time elapsed after the first time; (ae) detecting a second satellite providing the communication service to the specific area at the second time; (af) transmitting a hand-over request from the first satellite to perform a hand-over of the specific area to the second satellite, wherein the hand-over request includes a connection information with respect to a communication through the first satellite of a first terminal at the specific area; (ag) setting a first connection information with respect to a communication between the first satellite and the first terminal to a information with respect to a communication between the second satellite and the first terminal provisionally, wherein the connection information includes the first connection information; (ah) detecting a fourth satellite providing a communication service to a second terminal on the other end of the communication of the first terminal based on the connection information; (ai) detecting a third satellite positioned between the second satellite and the fourth satellite; (aj) provisionally setting a first connection to perform a communication between the second satellite and the third satellite to transmit a provisional setting notification that the first connection is set provisionally to the second satellite; (ak) judging whether or not a second connection provided between the third satellite and the fourth satellite is used when the first terminal communicates with the second terminal at the first time; (am) determining the hand-over can be performed when the provisional setting notification is transmitted if the second connection is judged to be used as result of the (ak) to transmit the determining result to the first satellite; and (an) performing the hand-over based on the determining result, wherein the hand-over is performed with using the first connection information and the first and second connections.

In order to achieve another aspect of the present invention, a hand-over processing method, includes: (ao) providing a first satellite, a second satellite and a third satellite, wherein the first, second and third satellites move in a same orbit with each other and each of the first, second and third satellites provides a communication service to a service area having a plurality of areas at a first time; (ap) detecting, of the plurality of areas of the service area of the first satellite, an area as a first specific area outside a service area to which the first satellite provides the communication service at a second time when a first predetermined time elapsed after the first time; (aq) detecting the second satellite providing the communication service to the first specific area at the second time; (ar) transmitting a first hand-over request from the first satellite to perform a first hand-over of the first specific areas to the second satellite; (as) judging whether or not the first hand-over can be performed in response to the first hand-over request to generate a first judging result; (at) transmitting the first judging result to the first satellite; (au) performing the first hand-over based on the first judging result; (av) detecting, of the plurality of areas of the service area of the second satellite, an area as a second specific area outside a service area to which the second satellite provides the communication service at a third time when a second predetermined time elapsed after the first time; (aw) detecting the third satellite providing the communication service to the second specific area at the third time; (ax) transmitting a second hand-over request from the second satellite to perform a second hand-over of the second specific area to the third satellite; (ay) judging whether or not the second hand-over can be performed in response to the second hand-over request to generate a second judging result; (az) transmitting the second judging result to the second satellite; (ba) performing the second hand-over based on the second judging result; and (bb) performing the first and second hand-overs in synchronization with each other.

In this case, a hand-over processing method further includes: (bc) setting one of the first, second, and third satellites as a master satellite; and (bd) transmitting a notify indicating of a performing time to perform the first and second hand-overs from the master satellite to ones of the first, second and third satellites other than the master satellite, and wherein the first and second hand-overs are performed at the performing time.

In order to achieve another aspect of the present invention, a hand-over processing method, includes: (be) providing a first satellite, a second satellite and a third satellite, wherein the first, second and third satellites move in a same first orbit with each other and each of the first, second and third satellites provides a communication service to a service area having a plurality of areas at a first time; (bf) providing a fourth satellite, a fifth satellite and a sixth satellite, wherein the fourth, fifth and sixth satellites move in a same second orbit with each other and each of the fourth, fifth and sixth satellites provides a communication service to a service area having a plurality of areas at a second time; (bg) detecting, of the plurality of areas of the service area of the first satellite, an area as a first specific area outside a service area to which the first satellite provides the communication service at a third time when a first predetermined time elapsed after the first time; (bh) detecting the second satellite providing the communication service to the first specific area at the third time; (bi) transmitting a first hand-over request from the first satellite to perform a first hand-over of the first specific area to the second satellite; (bj) judging whether or not the first hand-over can be performed in response to the first hand-over request to generate a first judging result; (bk) transmitting the first judging result to the first satellite; (bl) performing the first hand-over based on the first judging result; (bm) detecting, of the plurality of areas of the service area of the second satellite, an area as a second specific area outside a service area to which the second satellite provides the communication service at a fourth time when a second predetermined time elapsed after the first time; (bn) detecting the third satellite providing the communication service to the second specific area at the fourth time; (bo) transmitting a second hand-over request from the second satellite to perform a second hand-over of the second specific area to the third satellite; (bp) judging whether or not the second hand-over can be performed in response to the second hand-over request to generate a second judging result; (bq) transmitting the second judging result to the second satellite; (br) performing the second hand-over based on the second judging result; (bs) detecting, of the plurality of areas of the service area of the fourth satellite, an area as a third specific area outside a service area to which the fourth satellite provides the communication service at a fifth time when a third predetermined time elapsed after the second time; (bt) detecting the fifth satellite providing the communication service to the third specific area at the fifth time; (bu) transmitting a third hand-over request from the fourth satellite to perform a third hand-over of the third specific area to the fifth satellite; (bv) judging whether or not the third hand-over can be performed in response to the third hand-over request to generate a third judging result; (bw) transmitting the third judging result to the fourth satellite; (bx) performing the third hand-over based on the third judging result; (by) detecting, of the plurality of areas of the service area of the fifth satellite, an area as a fourth specific area outside a service area to which the fifth satellite provides the communication service at a sixth time when a fourth predetermined time elapsed after the second time; (bz) detecting the sixth satellite providing the communication service to the fourth specific area at the sixth time; (ca) transmitting a fourth hand-over request from the fifth satellite to perform a fourth hand-over of the fourth specific area to the sixth satellite; (cb) judging whether or not the fourth hand-over can be performed in response to the fourth hand-over request to generate a third judging result; (cc) transmitting the third judging result to the fifth satellite; (cd) performing the fourth hand-over based on the third judging result; and (ce) performing the first, second, third and fourth hand-overs in synchronization with each other.

In this case, a hand-over processing method further includes: (cf) setting one of the first, second and third satellites as a network master; (cg) setting one of the fourth, fifth and sixth satellites as a non-network master; (ch) transmitting a notify indicating of a performing time to perform the first, second, third and fourth hand-overs from the network master to the non-network master; (ci) transmitting the notify from the network master to ones of the first, second and third satellites other than the network master; and (cj) transmitting the notify from the non-network master to ones of the fourth, fifth and sixth satellites other than the non-network master; and wherein the first, second, third and fourth hand-overs are performed at the performing time.

Also in this case, wherein each orbit plane of the first and second orbits is one of a first plane of a polar orbit and a second plane having an angle which is slightly inclined from the polar orbit, and wherein the (cf) includes setting one moving near the pole of the first, second and third seatellites as the network master and the (cg) includes setting one moving near the pole of the fourth, fifth and sixth satellites as the non-network master.

In order to achieve still another aspect of the present invention, a hand-over processing method, includes: (ch) providing a first satellite providing a communication service to a service area at a first time; (ci) detecting a specific area outside a service area to which the first satellite provides the communication service at a second time when a predetermined time elapsed after the first time; (cj) detecting a second satellite providing the communication service to the specific area at th e second time; (ck) transmitting a hand-over request from the first satellite to perform a hand-over of a connection of a terminal communicating at the specific area to the second satellite; (cl) judging whether or not the hand-over can be performed in response to the hand-over request to transmit the judging result to the first satellite; and (cm) performing the hand-over based on the judging result.

In order to achieve yet still another aspect of the present invention, a hand-over processing system, includes: a first satellite providing a first satellite providing a communication service to a service area having a plurality of areas at a first time; a first detecting unit detecting, of the plurality of areas, an area as a specific area outside a service area to which the first satellite provides the communication service at a second time when a predetermined time elapsed after the first time; and a second detecting unit detecting a second satellite providing the communication service to the specific area at the second time, and wherein the first satellite transmits a hand-over request to perform a hand-over of the specific area to the second satellite, and wherein the second satellite judges whether or not the hand-over can be performed in response to the hand-over request to transmit the judging result to the first satellite, and wherein the first satellite performs the hand-over based on the judging result.

In this case, wherein the first satellite performs the hand-over at the second time.

Also in this case, wherein the specific area on which the hand-over is performed includes a plurality of connections of a plurality of terminals at the specific area, and wherein the first satellite performs the hand-over on the plurality of connections at a same time.

Further in this case, wherein the predetermined time corresponds to a time needed to perform the hand-over after the hand-over request is transmitted.

In this case, wherein the first and second detecting units include detecting the specific area and the second satellite respectively based on a first data indicating positions of the first and second satellites at the first time and a second data indicating positions of the first and second satellites at the second time.

Also in this case, wherein the first and second detecting units are provided in a ground station.

Further in this case, wherein the second satellite includes a plurality of second beam emitting units, the plurality of second beam emitting units being able to emit beams to the plurality of areas respectively, and wherein the second satellite reserves one which is not used of the plurality of second beam emitting units when the hand-over request is transmitted to the second satellite, and wherein the reserved second beam emitting unit emits a beam to the specific area when the hand-over is performed.

In this case, wherein the first satellite includes a plurality of first beam emitting units, the plurality of first beam emitting units emitting beams to the plurality of areas respectively, and wherein the second satellite includes a plurality of second beam emitting units, the plurality of second beam emitting units being able to emit beams to the plurality of areas respectively.

Also in this case, wherein the first satellite has a first connection information with respect to a communication between the first satellite and a first terminal at the specific area, and wherein the second satellite uses the first connection information as a information with respect to a communication between the second satellite and the first terminal when the hand-over is performed.

In order to achieve another aspect of the present invention, a hand-over processing system, includes: a first satellite providing a communication service to a service area having a plurality of areas at a first time; a first detecting unit detecting, of the plurality of areas, an area as a specific area outside a service area to which the first satellite provides the communication service at a second time when a predetermined time elapsed after the first time; and a second detecting unit detecting a second satellite providing the communication service to the specific area at the second time, and wherein the first satellite transmits a hand-over request to perform a hand-over of the specific area to the second satellite, the hand-over request including a connection information with respect to a communication through the first satellite of a first terminal at the specific area, and wherein the second satellite sets a first connection information with respect to a communication between the first satellite and the first terminal to a information with respect to a communication between the second satellite and the first terminal provisionally, the connection information including the first connection information and detects a fourth satellite providing a communication service to a second terminal on the other end of the communication of the first terminal based on the connection information, and wherein the fourth satellite provisionally sets a second connection to perform a communication between the second satellite and the fourth satellite and transmits a provisional setting notification that the second connection is set provisionally to the second satellite, and wherein the second satellite judges the hand-over can be performed when the provisional setting notification is transmitted to transmit the judging result to the first satellite and wherein the first satellite performs the hand-over based on the judging result, the hand-over being performed with using the first connection information and the second connection.

In order to achieve still another aspect of the present invention, a hand-over processing system, includes: a first satellite providing a communication service to a service area having a plurality of areas at a first time; a first detecting unit detecting, of the plurality of areas, an area as a specific area outside a service area to which the first satellite provides the communication service at a second time when a predetermined time elapsed after the first time; and a second detecting unit detecting a second satellite providing the communication service to the specific area at the second time, and wherein the first satellite transmits a hand-over request to perform a hand-over of the specific area to the second satellite, the hand-over request including a connection information with respect to a communication through the first satellite of a first terminal at the specific area, and wherein the second satellite sets a first connection information with respect to a communication between the first satellite and the first terminal to a information with respect to a communication between the second satellite and the first terminal provisionally, the connection information including the first connection information and detects a fourth satellite providing a communication service to a second terminal on the other end of the communication of the first terminal based on the connection information and detects a third satellite positioned between the second satellite and the fourth satellite, and wherein the third satellite provisionally sets a first connection to perform a communication between the second satellite and the third satellite to transmit a first provisional setting notification that the first connection is set provisionally to the second satellite, and wherein the fourth satellite provisionally sets a second connection to perform a communication between the third satellite and the fourth satellite to transmit a second provisional setting notification that the second connection is set provisionally to the third satellite, and wherein the third satellite transmits the second provisional setting notification to the second satellite, and wherein the second satellite judges the hand-over can be performed when the first and second provisional setting notifications are transmitted to transmit the judging result to the first satellite, and wherein the first satellite performs the hand-over based on the judging result, the hand-over being performed with using the first connection information and the first and second connections.

In order to achieve yet still another aspect of the present invention, a hand-over processing system, includes: a first satellite providing a communication service to a service area having a plurality of areas at a first time; a first detecting unit detecting, of the plurality of areas, an area as a specific area outside a service area to which the first satellite provides the communication service at a second time when a predetermined time elapsed after the first time; and a second detecting unit detecting a second satellite providing the communication service to the specific area at the second time, and wherein the first satellite transmits a hand-over request to perform a hand-over of the specific area to the second satellite, the hand-over request including a connection information with respect to a communication through the first satellite of a first terminal at the specific area, and wherein the second satellite sets a first connection information with respect to a communication between the first satellite and the first terminal to a information with respect to a communication between the second satellite and the first terminal provisionally, the connection information including the first connection information and detects a fourth satellite providing a communication service to a second terminal on the other end of the communication of the first terminal based on the connection information and detects a third satellite positioned between the second satellite and the fourth satellite, and wherein the third satellite provisionally sets a first connection to perform a communication between the second satellite and the third satellite to transmit a provisional setting notification that the first connection is set provisionally to the second satellite, and wherein the second satellite judges whether or not a second connection provided between the third satellite and the fourth satellite is used when the first terminal communicates with the second terminal at the first time and determines the hand-over can be performed when the second satellite receives the provisional setting notification if the second satellite judges the second connection is used to transmit the determining result to the first satellite and wherein the first satellite performs the hand-over based on the determining result, the hand-over being performed with using the first connection information and the first and second connections.

In order to achieve another aspect of the present invention, a hand-over processing system, includes: a first satellite; a second satellite; a third satellite, wherein the first, second and third satellites move in a same orbit with each other and each of the first, second and third satellites provides a communication service to a service area having a plurality of areas at a first time; a first detecting unit detecting, of the plurality of areas of the service area of the first satellite, an area as a first specific area outside a service area to which the first satellite provides the communication service at a second time when a first predetermined time elapsed after the first time; and a second detecting unit detecting the second satellite providing the communication service to the first specific area at the second time, and wherein the first satellite transmits a first hand-over request to perform a first hand-over of the first specific area to the second satellite, and wherein the second satellite judges whether or not the first hand-over can be performed in response to the first hand-over request to generate a first judging result and transmits the first judging result to the first satellite, and wherein the first satellite performs the first hand-over based on the first judging result, and wherein the hand-over processing system, further includes: a third detecting unit detecting, of the plurality of areas of the service area of the second satellite, an area as a second specific area outside a service area to which the second satellite provides the communication service at a third time when a second predetermined time elapsed after the first time; and a fourth detecting unit detecting the third satellite providing the communication service to the second specific area at the third time, and wherein the second satellite transmits a second hand-over request to perform a second hand-over of the second specific area to the third satellite, and wherein the third satellite judges whether or not the second hand-over can be performed in response to the second hand-over request to generate a second judging result and transmits the second judging result to the second satellite, and wherein the second satellite performs the second hand-over based on the second judging result and wherein the first and second satellites perform the first and second hand-overs in synchronization with each other.

In this case, wherein one of the first, second, and third satellites is set as a master satellite, and the master satellite transmits a notify indicating of a performing time to perform the first and second hand-overs to ones of the first, second and third satellites other than the master satellite, and wherein the first and second hand-overs are performed at the performing time.

In order to achieve still another aspect of the present invention, a hand-over processing system, includes: a first satellite; a second satellite; a third satellite, wherein the first, second and third satellites move in a same first orbit with each other and each of the first, second and third satellites provides a communication service to a service area having a plurality of areas at a first time; a fourth satellite; a fifth satellite; a sixth satellite, wherein the fourth, fifth and sixth satellites move in a same second orbit with each other and each of the fourth, fifth and sixth satellites provides a communication service to a service area having a plurality of areas at a second time; a first detecting unit detecting, of the plurality of areas of the service area of the first satellite, an area as a first specific area outside a service area to which the first satellite provides the communication service at a third time when a first predetermined time elapsed after the first time; a second detecting unit detecting the second satellite providing the communication service to the first specific area at the third time, and wherein the first satellite transmits a first hand-over request to perform a first hand-over of the first specific area to the second satellite, and wherein the second satellite judges whether or not the first hand-over can be performed in response to the first hand-over request to generate a first judging result and transmits the first judging result to the first satellite, and wherein the first satellite performs the first hand-over based on the first judging result, and wherein the hand-over processing system, further includes: a third detecting unit detecting, of the plurality of areas of the service area of the second satellite, an area as a second specific area outside a service area to which the second satellite provides the communication service at a fourth time when a second predetermined time elapsed after the first time; and a fourth detecting unit detecting the third satellite providing the communication service to the second specific area at the fourth time, and wherein the second satellite transmits a second hand-over request to perform a second hand-over of the second specific area to the third satellite, and wherein the third satellite judges whether or not the second hand-over can be performed in response to the second hand-over request to generate a second judging result and transmits the second judging result to the second satellite, and wherein the second satellite performs the second hand-over based on the second judging result, and wherein the hand-over processing system, further includes: a fifth detecting unit detecting, of the plurality of areas of the service area of the fourth satellite, an area as a third specific area outside a service area to which the fourth satellite provides the communication service at a fifth time when a third predetermined time elapsed after the second time; and a sixth detecting unit detecting the fifth satellite providing the communication service to the third specific area at the fifth time, and wherein the fourth satellite transmits a third hand-over request to perform a third hand-over of the third specific area to the fifth satellite, and wherein the fifth satellite judges whether or not the third hand-over can be performed in response to the third hand-over request to generate a third judging result and transmits the third judging result to the fourth satellite, and wherein the fourth satellite performs the third hand-over based on the third judging result, and wherein the hand-over processing system, further includes: a seventh detecting unit detecting, of the plurality of areas of the service area of the fifth satellite, an area as a fourth specific area outside a service area to which the fifth satellite provides the communication service at a sixth time when a fourth predetermined time elapsed after the second time; and a eighth detecting unit detecting the sixth satellite providing the communication service to the fourth specific area at the sixth time, and wherein the fifth satellite transmits a fourth hand-over request to perform a fourth hand-over of the fourth specific area to the sixth satellite, and wherein the sixth satellite judges whether or not the fourth hand-over can be performed in response to the fourth hand-over request to generate a third judging result and transmits the third judging result to the fifth satellite, and wherein the fifth satellite performs the fourth hand-over based on the third judging result and wherein the first, second, third and fourth hand-overs are performed in synchronization with each other.

In this case, one of the first, second and third satellites is set as a network master and one of the fourth, fifth and sixth satellites is set as a non-network master, and wherein the network master transmits a notify indicating of a performing time to perform the first, second, third and fourth hand-overs to the non-network master, and wherein the network master transmits the notify to ones of the first, second and third satellites other than the network master, and wherein the non-network master transmits the notify to ones of the fourth, fifth and sixth satellites other than the non-network master and wherein the first, second, third and fourth hand-overs are performed at the performing time.

Also in this case, wherein each orbit plane of the first and second orbits is one of a first plane of a polar orbit and a second plane having an angle which is slightly inclined from the polar orbit, and wherein the network master is set to be one moving near the pole of the first, second and third satellites and the non-network master is set to be one moving near the pole of the fourth, fifth and sixth satellites.

In order to achieve yet still another aspect of the present invention, a hand-over processing system, includes: a first satellite providing a communication service to a service area at a first time; a first detecting unit detecting a specific area outside a service area to which the first satellite provides the communication service at a second time when a predetermined time elapsed after the first time; and a second detecting unit detecting a second satellite providing the communication service to the specific area at the second time, and wherein the first satellite transmits a hand-over request to perform a hand-over of a connection of a terminal communicating at the specific area to the second satellite, and wherein the second satellite judges whether or not the hand-over can be performed in response to the hand-over request to transmit the judging result to the first satellite and wherein the first satellite performs the hand-over based on the judging result.

BRIEF DESCRIPTION OF THE DRAWINGS

FIG. 2 is a concept view showing a hand-over carried out at an area unit in the hand-over processing system;

FIG. 3 is a view showing an example of a terminal-to-satellite connection information table in a connection management table managed by the hand-over processing system;

FIG. 4 is a view showing an example of a satellite-to-satellite connection information table in the connection management table managed by the hand-over processing system;

FIG. 5 is a view showing an example of an ATM-SW conversion information table in the connection management table managed by the hand-over processing system;

FIG. 19 is a view showing a hand-over processing system in an LEO network that is a fifth embodiment of the present invention.

DESCRIPTION OF THE PREFERRED EMBODIMENTS

Embodiments of the present invention will be described below with reference to the attached drawings. The descriptions are actually done by using the embodiments.
(First Embodiment)

Figure 1:
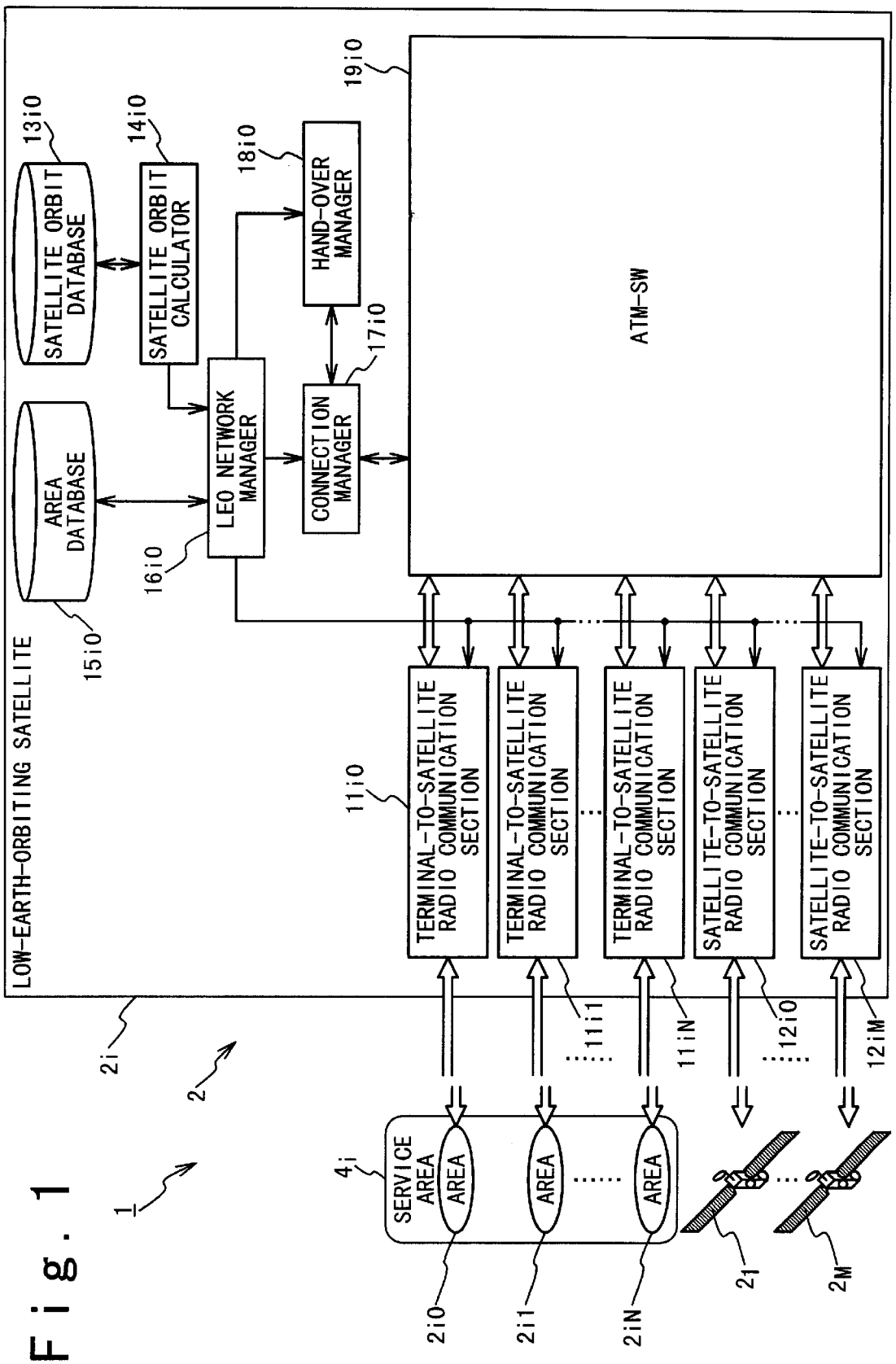
FIG. 1 is a block diagram showing an electrical configuration of a hand-over processing system in a LEO network that is a first embodiment of the present invention.

FIG. 1 is a block diagram showing an electrical configuration of a hand-over processing system in an LEO network that is a first embodiment of the present invention. FIG. 2 is a concept view showing the hand-over process carried out in a unit of an area in the hand-over processing system. FIG. 3 is a view showing an example of a connection information table between a terminal and a satellite constituting a connection management table managed by the hand-over processing system.

Figure 6:
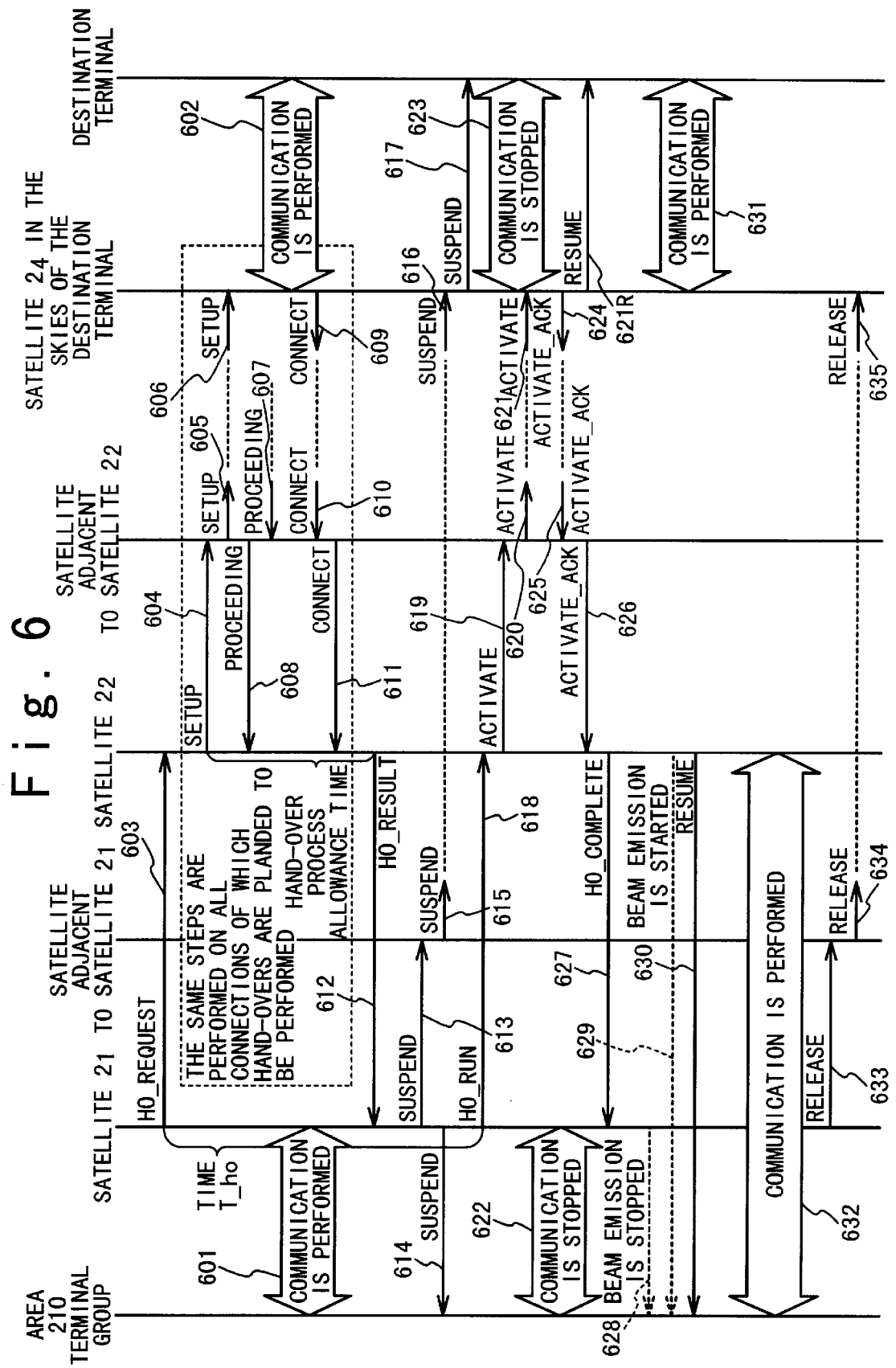
FIG. 6 is a time sequence chart showing sequence steps which are sent and received between satellites in related to the hand-over process in the hand-over processing system.
Figure 7:
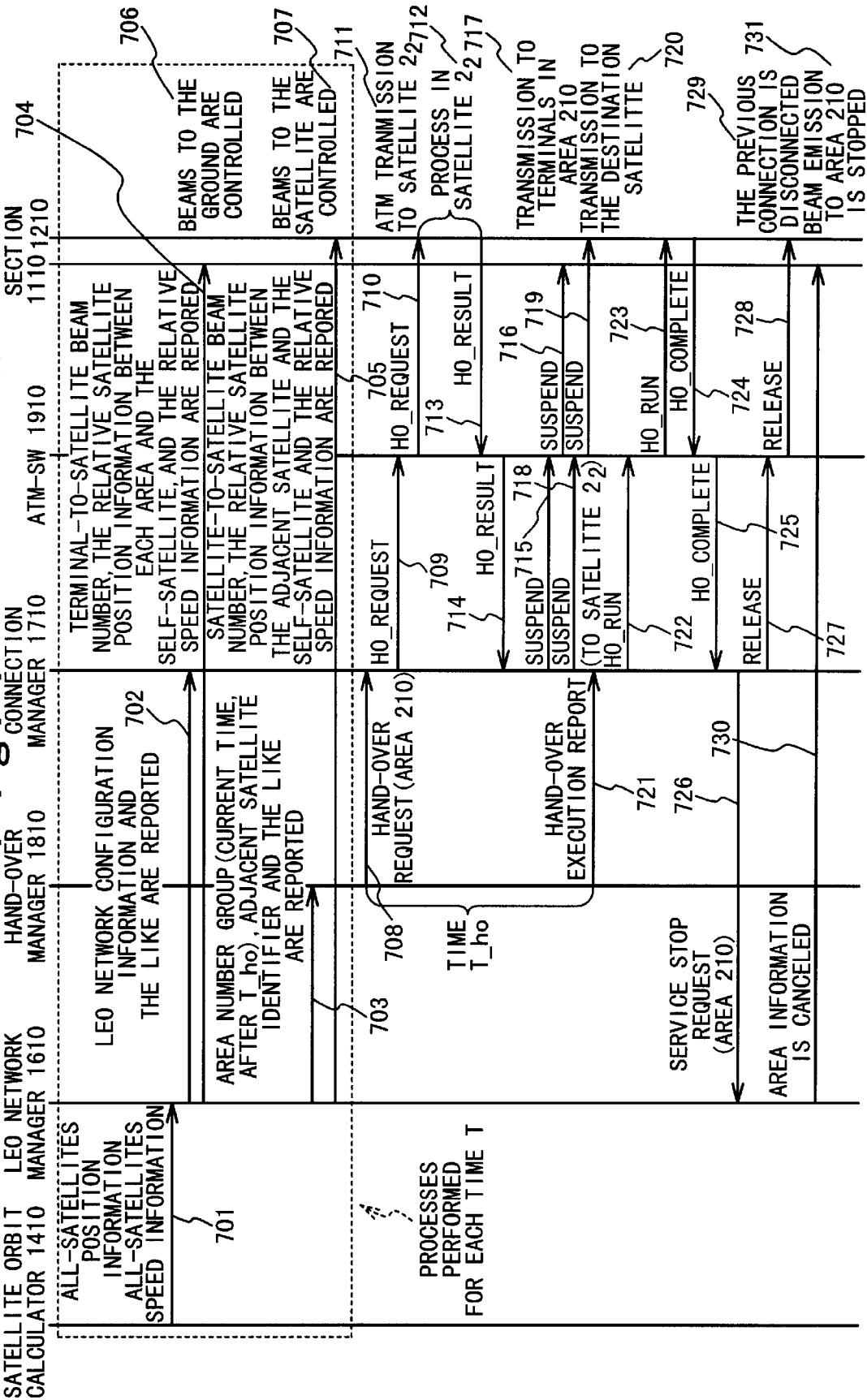
FIG. 7 is a time sequence chart showing sequence steps between respective sections within a hand-over source satellite in the hand-over processing system.

FIG. 4 is a view showing an example of a connection information table between a satellite and a satellite of the connection management table managed by the hand-over processing system. FIG. 5 is a view showing an example of an ATM-SW information table of the connection management table managed by the hand-over processing system. FIG. 6 is a time sequence chart showing the sequence steps between the satellites in relation to the hand-over process within the hand-over processing system. FIG. 7 is a time sequence chart showing the sequence steps between respective sections within a hand-over source satellite of the hand-over processing system.

Figure 8:
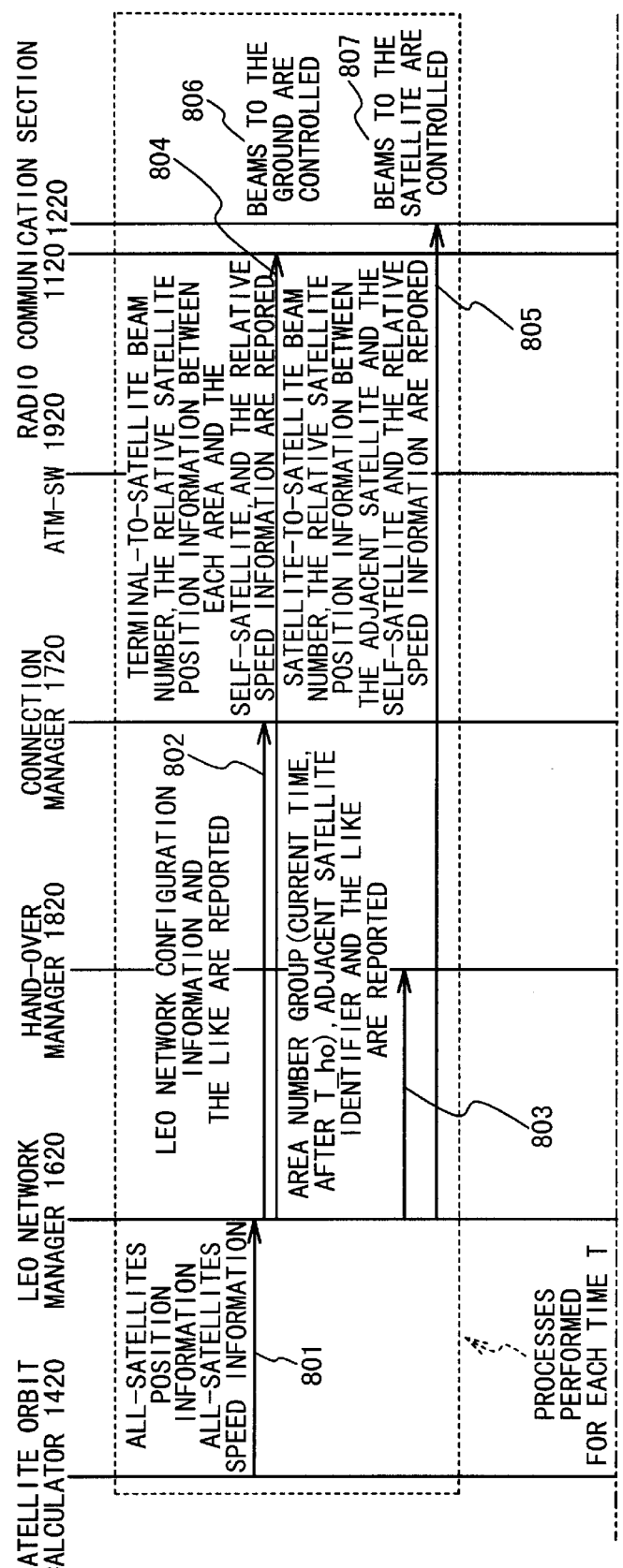
FIG. 8 is a time sequence chart showing a part of sequence steps between respective sections within a hand-over destination satellite in the hand-over processing system.
Figure 9:
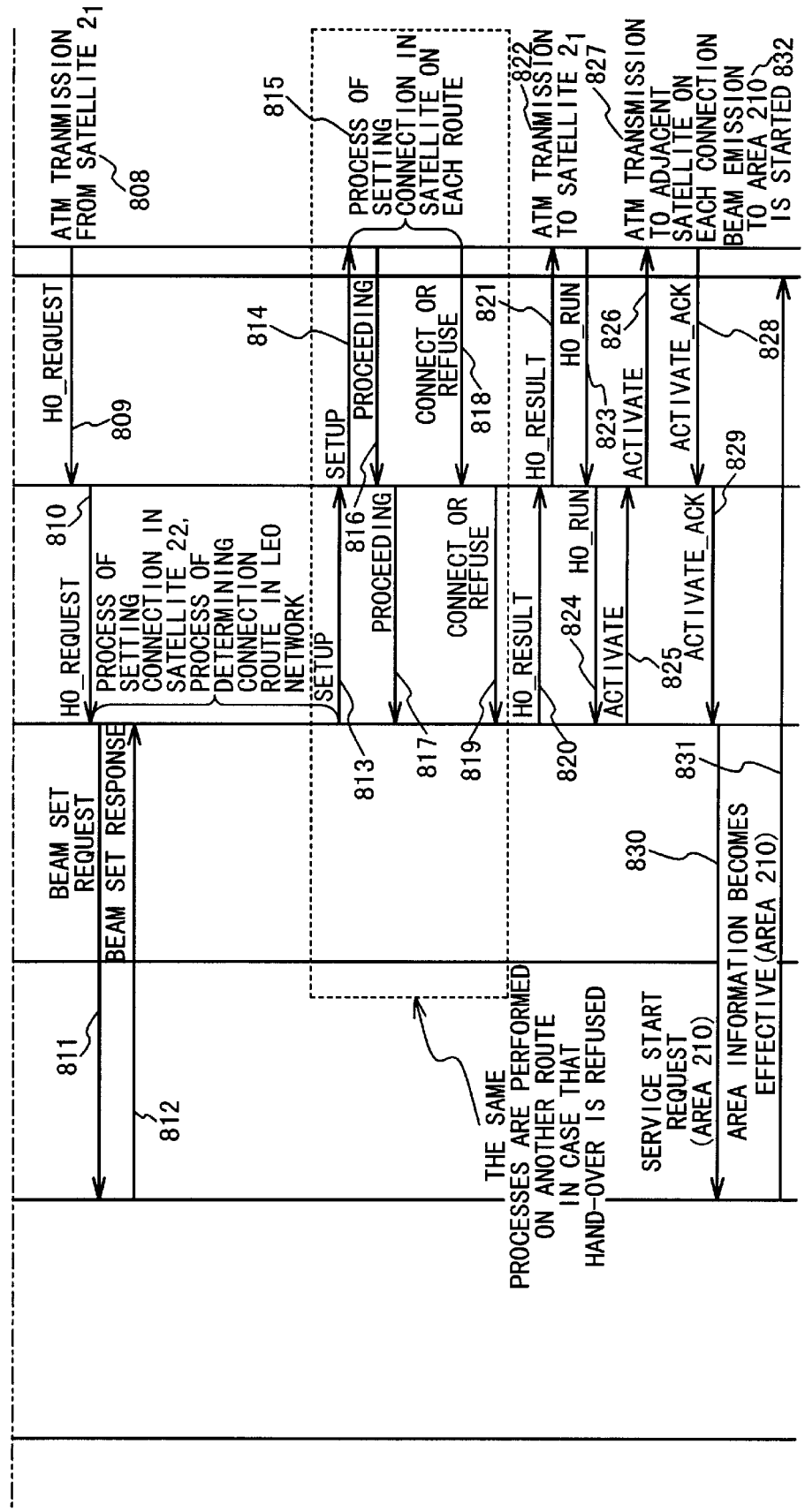
FIG. 9 is a time sequence chart showing the other part of sequence steps between respective sections within a hand-over destination satellite in the hand-over processing system.

FIG. 8 is a time sequence chart showing a part of the sequence steps within respective sections within a hand-over destination satellite of the hand-over processing system. FIG. 9 is a time sequence chart showing the other part of the sequence steps within respective sections within a hand-over destination satellite of the hand-over processing system.

Figure 10:
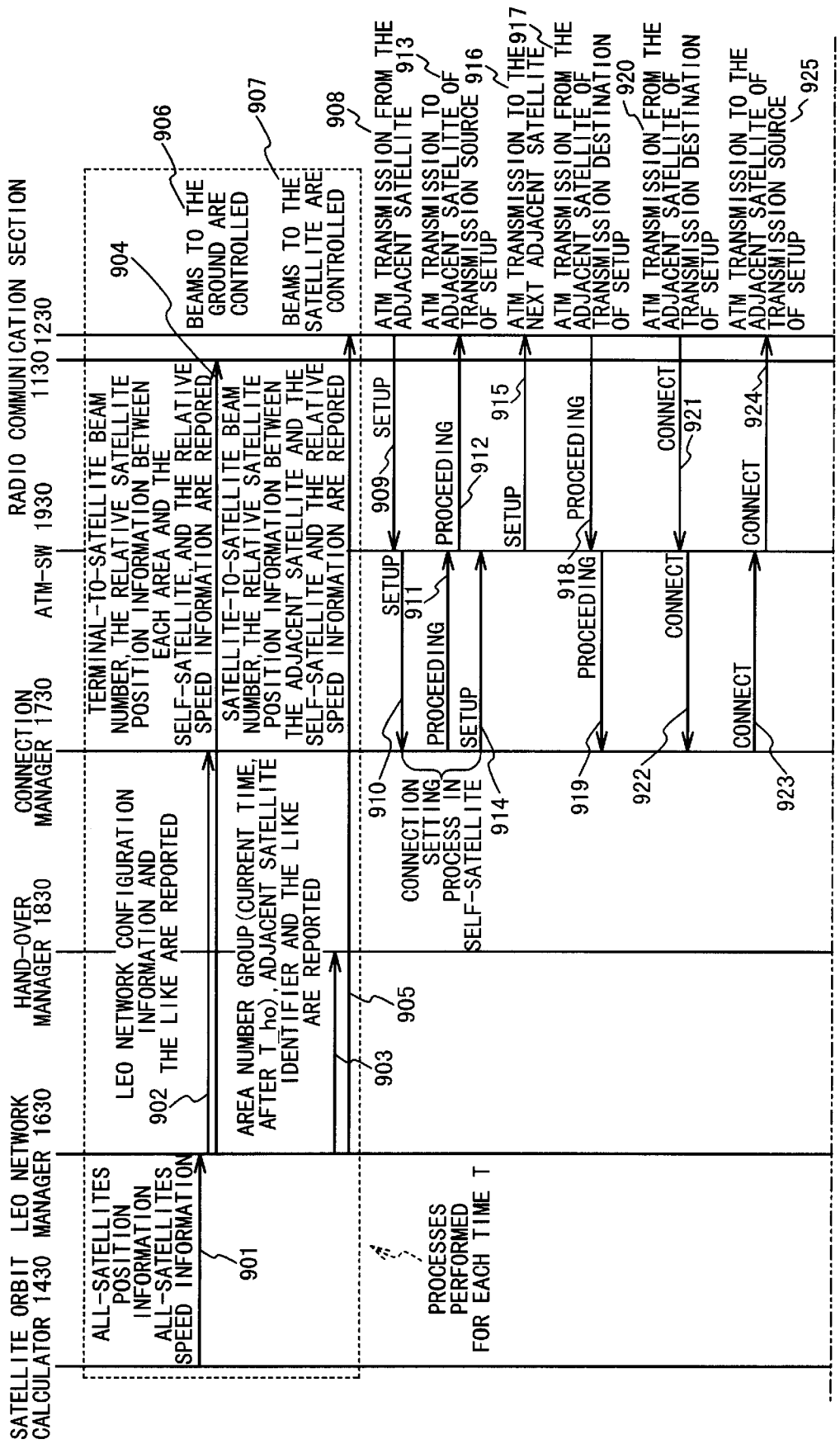
FIG. 10 is a time sequence chart showing a part of sequence steps between respective sections within a middle satellite in the hand-over processing system.
Figure 11:
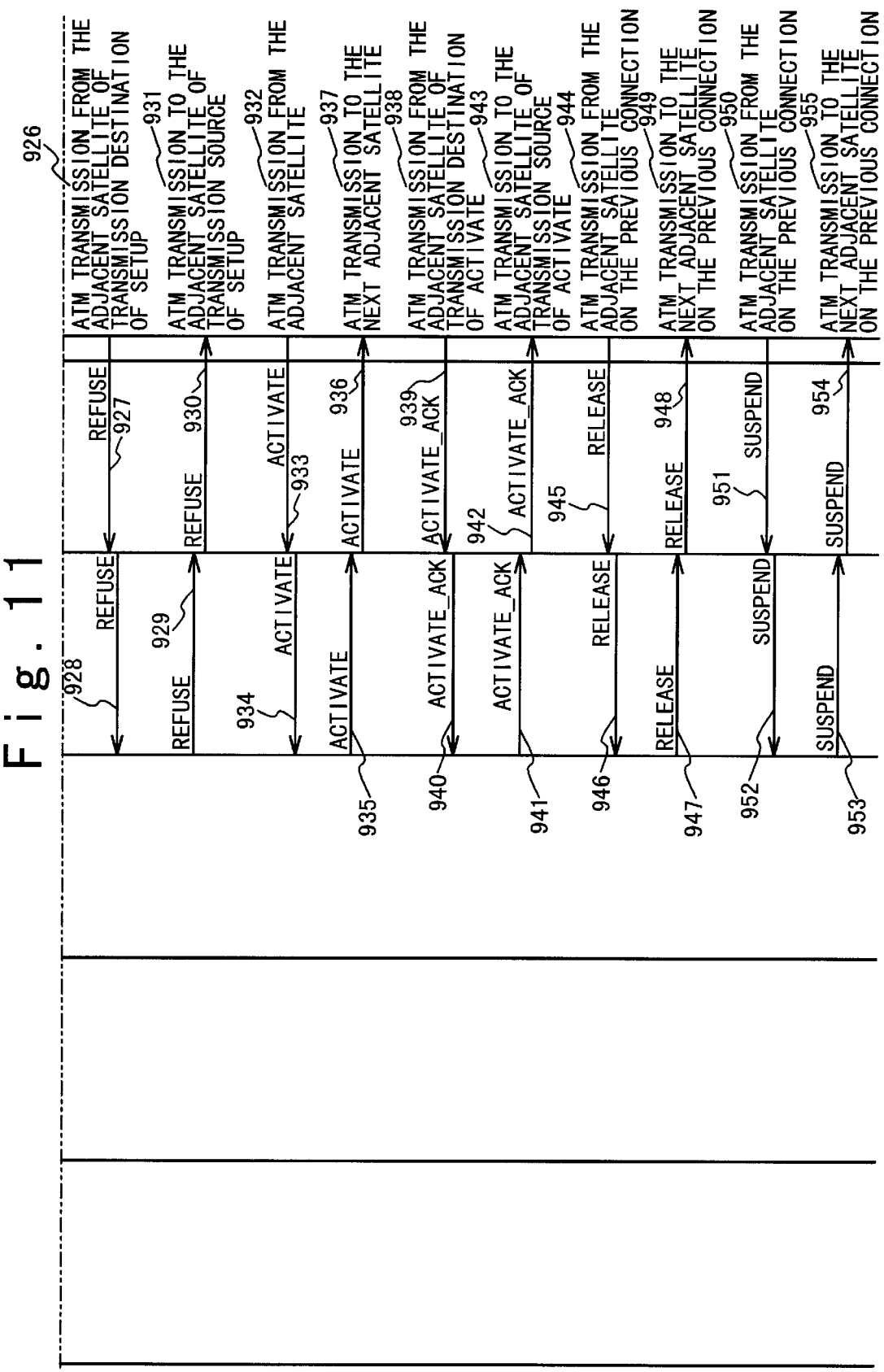
FIG. 11 is a time sequence chart showing the other part of sequence steps between respective sections within a middle satellite in the hand-over processing system.

FIG. 10 is a time sequence chart showing a part of the sequence steps between respective sections within a middle satellite of the hand-over processing system. FIG. 11 is a time sequence chart showing the other part of the sequence steps between respective sections within a middle satellite of the hand-over processing system.

Figure 12:
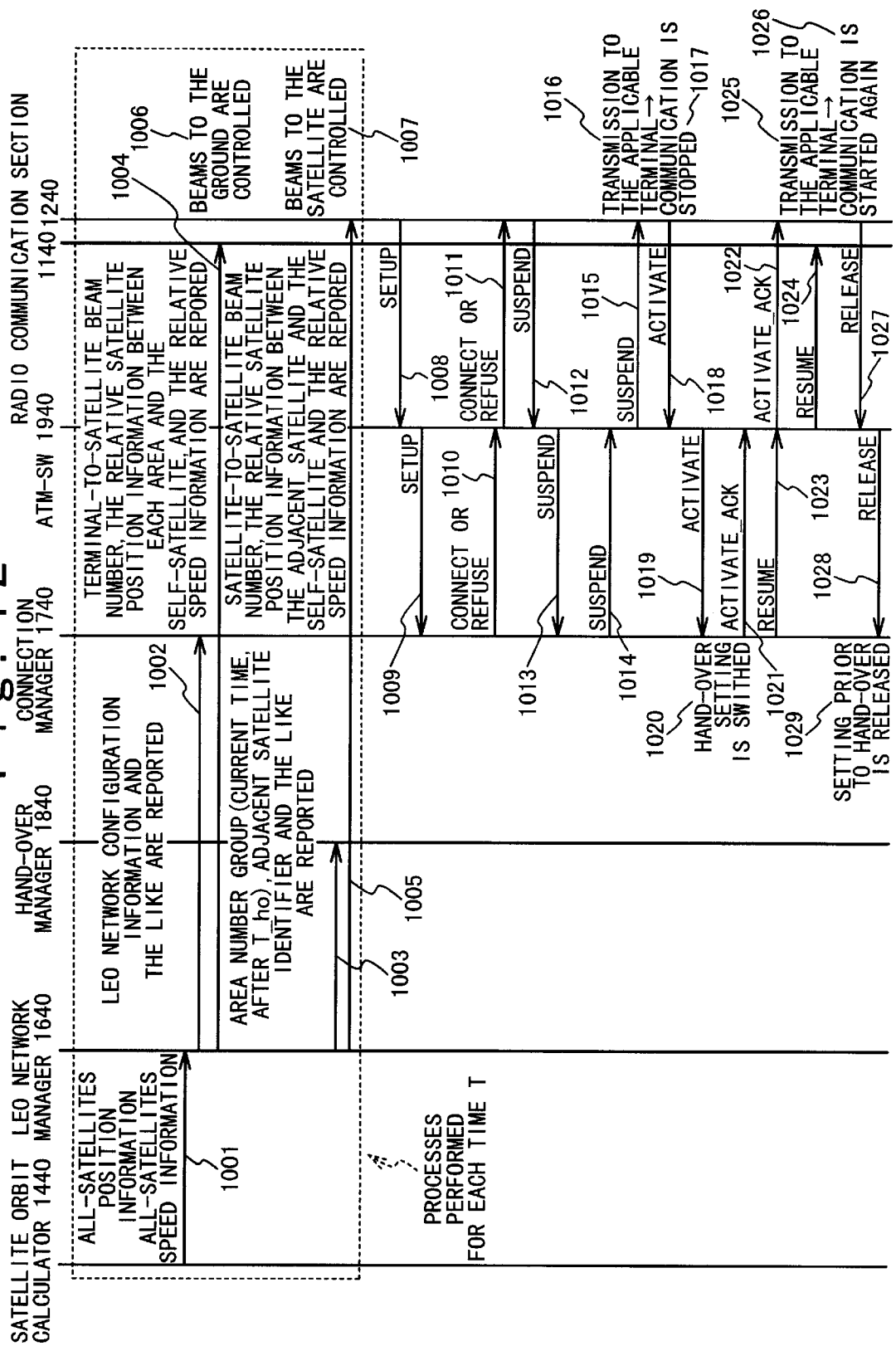
FIG. 12 is a time sequence chart showing sequence steps which are sent and received between respective sections within a satellite in skies of a destination in the hand-over processing system.
Figure 13:
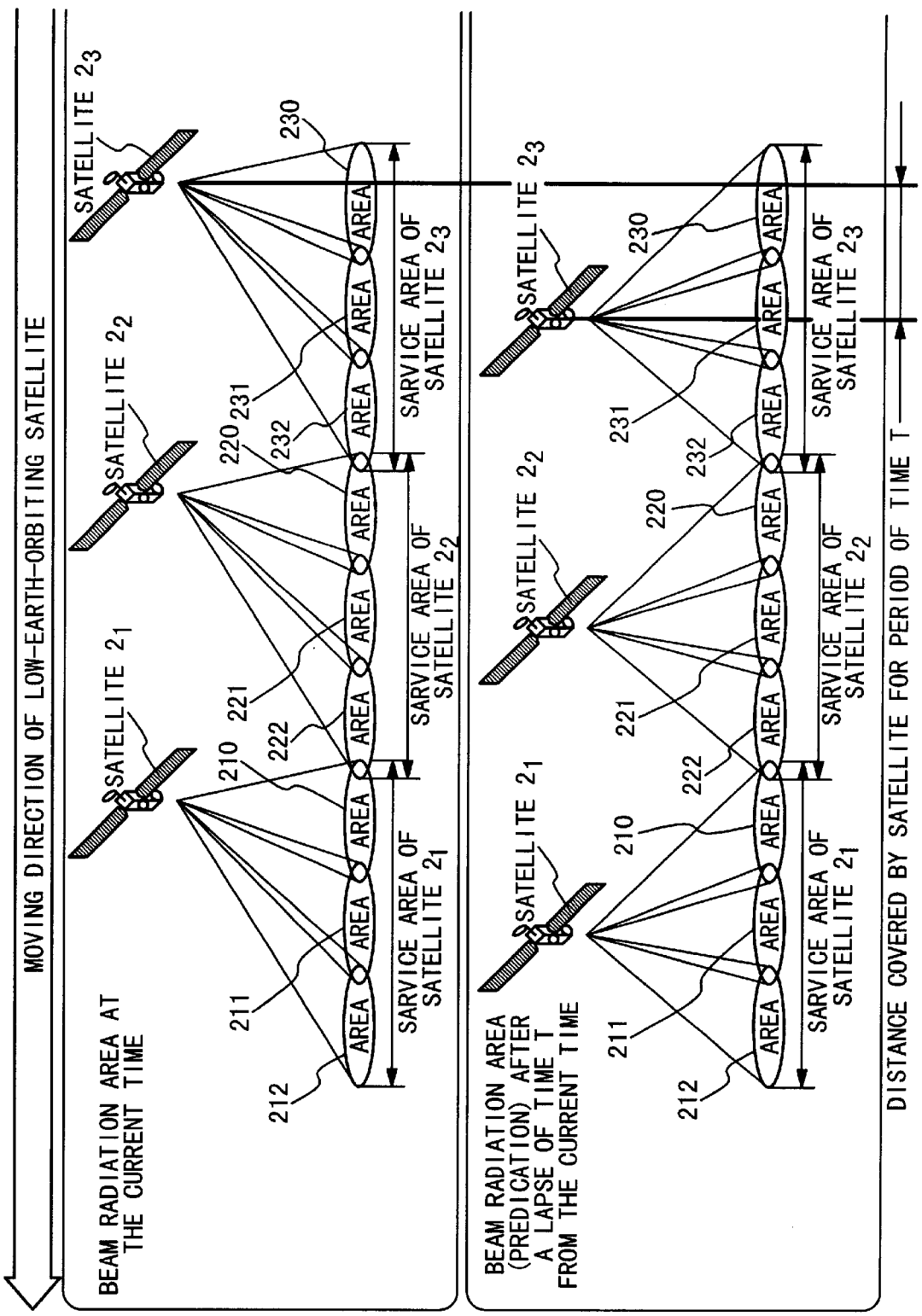
FIG. 13 is a view showing an illustration example of an area that is not outside a service area in the hand-over processing system.
Figure 14:
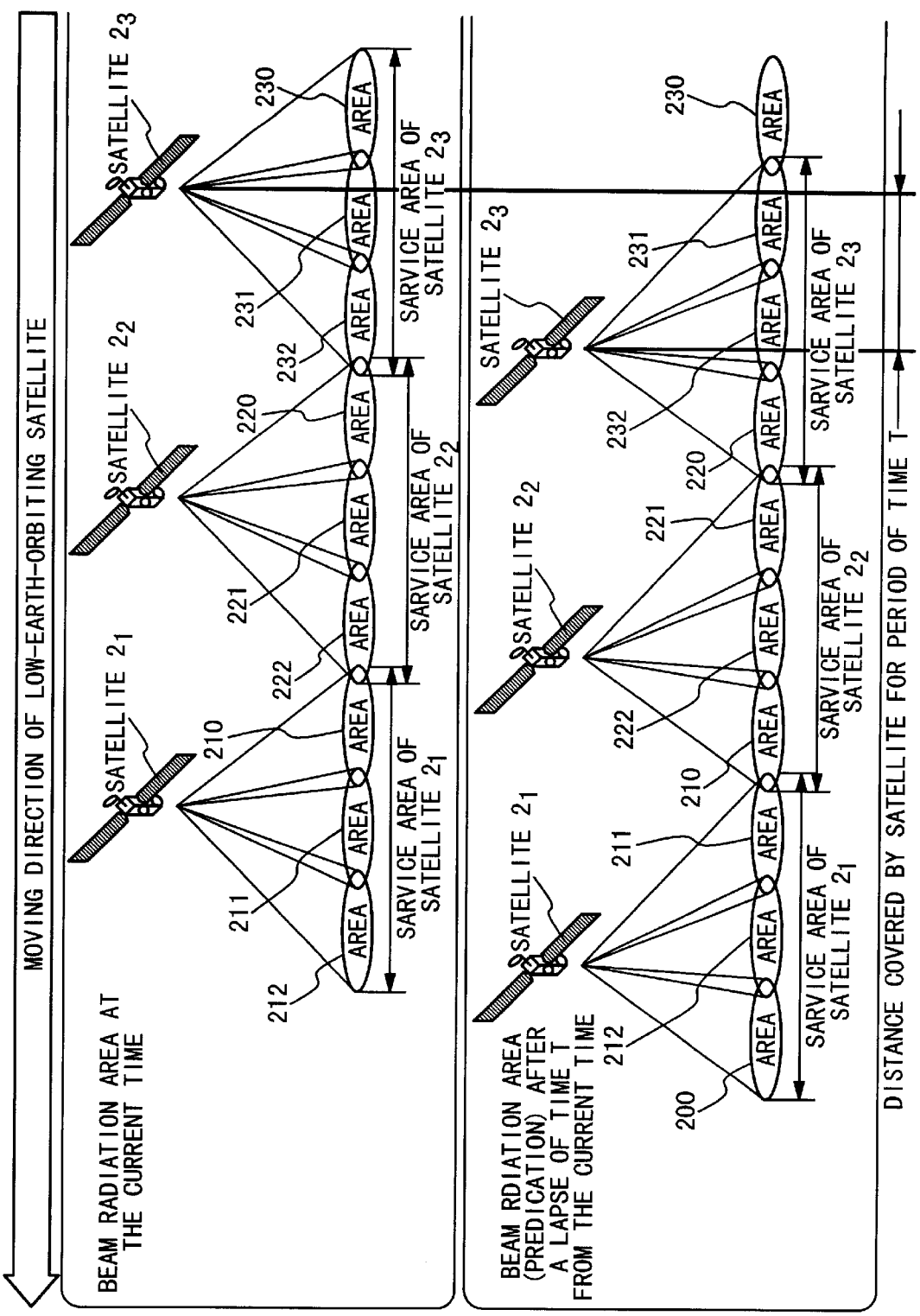
FIG. 14 is a view showing an illustration example of an area that is outside the service area in the hand-over processing system.

FIG. 12 is a time sequence chart showing the sequence steps between respective sections in the skies of the destination of the hand-over processing system. FIG. 13 is a view showing an illustration example of an area that does not become outside a service area in the hand-over processing system. And, FIG. 14 is a view showing an illustration example of an area that becomes outside the service area in the hand-over processing system.

In the hand-over processing system in this embodiment, the connections within the LEO network from a communication satellite (hereafter, merely referred to as a satellite) of the hand-over source to a satellite of the hand-over destination are set in advance at a unit of an area prior to the hand-over process. And then, at a time when the hand-over process can be done, the hand-over processes are simultaneously done at the area unit at a timing of the hand-over execution. As shown in FIG. 2, the hand-over processing system 1 is schematically provided with a low-Earth-orbiting satellite group 2 and a ground terminal group 3 (the reference number 3 is not shown in FIG. 2). The low-Earth-orbiting satellite group 2 has a plurality of low-Earth-orbiting satellites $2i$ (i=1, 2 to M). Each of the plurality of low-Earth-orbiting satellites has one or more electrical wave emitters. The plurality of low-Earth-orbiting satellites circulate in one or more orbit planes. A ground terminal group 3 has a plurality of radio terminals. Each of the plurality of radio terminals communicates with the low-Earth-orbiting satellite $2i$.

A service area $4i$ has a plurality (N+1) of areas ($2i0$ to $2i$N). Each low-Earth-orbiting satellite $2i$ has a plurality of the electrical wave emitters. All of the plurality of the electrical wave emitters can emit a radio beam to each of the plurality of areas $2i0$ to $2i$N within the service area $4i$ in a one-to-one relationship. Each low-Earth-orbiting satellite $2i$ further has at least one spare electrical wave emitter in addition to the plurality of the electrical wave emitters corresponding to the plurality of areas $2i0$ to $2i$N in the one-to-one relationship. The spare electrical wave emitter is used for the hand-over process. The areas $2i0$ to $2i$N adjacent to each other within the service area $4i$ partially overlap with each other (FIG. 2).

As shown in FIG. 1, the low-Earth-orbiting satellite $2i$ is provided with terminal-to-satellite radio communication sections $11i0$ to $11i$N, satellite-to-satellite radio communication sections $12i0$ to $12i$M, a satellite orbit database $13i0$, a satellite orbit calculator $14i0$, an LEO network manager $16i0$, a connection manager $17i0$, a hand-over manager $18i0$, an area database $15i0$ and an ATM-SW $19i0$.

Each of the plurality of radio terminals is located so as to be fixed or moved from a certain area to another area, and also provides with a radio communication section and an ATM communication device. The radio communication section carries out a function of a satellite communication between the terminal and a satellite. And, the ATM communication device carries out a function similar to that of the ATM terminal in an existing ground ATM network.

The satellite orbit database 13$i$0 stores therein the orbit calculation information indicating of the orbits of all satellites existing in the LEO network in this embodiment.

The satellite orbit calculator 14$i$0 calculates all-satellites position information (latitudes, longitudes and altitudes) and all-satellites speed information (directions and speeds) for each time T at a start time of the time T (hereafter, referred to as a current time) and a T_ho time when a predetermined time T_ho elapsed after the current time, based on the orbit calculation information stored in the satellite orbit database 13$i$0.

The satellite orbit calculator 14$i$0 reports the calculation results to the LEO network manager 16$i$0. The above-mentioned predetermined time T_ho is a time from the current time to a time of a completion in a pre-process of the hand-over process. A value of the predetermined time T_ho differs depending on the configuration of the hand-over processing system.

The area database 15$i$0, based on an area number assigned to each area 2$i$N in advance, stores therein, for example, an area number of each area 2$i$N, a latitude of a central position of each area 2$i$N, a longitude of the central position of each area 2$i$N and a usage frequency of each area 2$i$N, as an area data. The areas 2$i$N have the area numbers different from each other in the LEO network. Also, different frequencies are used in the areas 2$i$N adjacent to each other. However, there may be a case that the same frequency band is used in the areas 2$i$N which are not adjacent to each other.

The LEO network manager 16$i$0 determines LEO network configurations at the current time and the T_ho time, respectively based on the all-satellites position information (latitudes, longitudes and altitudes) and the all-satellites speed information (directions and speeds) at the current time and the T_ho time outputted from the satellite orbit calculator 14$i$0, to generate LEO network configuration information (described later).

The LEO network manager 16$i$0 determines the service area 4$i$ and the terminal-to-satellite radio communication sections 11$i$N used for the respective areas 2$i$N in the service area 4$i$ at the current time based on the area data from the area database 15$i$0.

The LEO network manager 16$i$0 generates a first corresponding data to correspond the area numbers of the respective areas 2$i$N to terminal-to-satellite beam numbers. The terminal-to-satellite beam numbers are used to identify the plurality of terminal-to-satellite radio communication sections 11$i$N.

The LEO network manager 16$i$0 determines the satellite-to-satellite radio communication section 12$i$M used for the satellite-to-satellite communication between respective adjacent satellites 2$i$.

The LEO network manager 16$i$0 generates a second corresponding data to correspond satellite identifiers of the adjacent satellites 2$i$ to satellite-to-satellite beam numbers. The satellite-to-satellite beam numbers are used to identify the plurality of satellite-to-satellite radio communication sections 12$i$M.

The LEO network manager 16$i$0 generates a relative satellite position information (positions in X-axis, Y-axis and Z-axis directions with a position indicated by each of the area data as an original point) between each determined area and the self-satellite, and a relative satellite speed information (moving speeds in X-axis, Y-axis and Z-axis directions with a position indicated by each of the area data as an original point).

The LEO network manager 16$i$0 generates a relative position information (positions in X-axis, Y-axis and Z-axis directions with the self-satellite as an original point) between the self-satellite and the adjacent satellite, and a relative satellite speed information (moving speeds in X-axis, Y-axis and Z-axis directions with the self-satellite as an original point).

The LEO network manager 16$i$0 determines the service area 4$i$ with regard to the LEO network at the T_ho time.

The LEO network manager 16$i$0 generates the relative position information (positions in X-axis, Y-axis and Z-axis directions with the self-satellite as the original point) between the self-satellite and the adjacent satellite and the relative satellite speed information (moving speeds in X-axis, Y-axis and Z-axis directions with the self-satellite as the original point), with regard to the LEO network at the T_ho time.

The LEO network manager 16$i$0 determines a terminal-to-satellite radio communication section 11$i$N used in the area 2$i$N on which the hand-over process is performed at a time of the execution of the hand-over process.

The LEO network configuration information determined by the LEO network manager 16$i$0 indicates a connection state between the respective satellites 2$i$ (namely, indicates the satellites 2$i$ connected to each other), and also indicates the area 2$i$N that each satellite 2$i$ is currently servicing (for example, a service area 4$_1$ of a satellite 2$_1$ includes areas 210 to 21N (refer to FIG. 2).

The LEO network manager 16$i$0 reports the relative satellite position information between the self-satellite and the area to which a radio beam is emitted, by each of the terminal-to-satellite radio communication sections 11$i$0 to 11$i$N, the relative satellite speed information and respective terminal-to-satellite beam numbers, to the terminal-to-satellite radio communication sections 11$i$0 to 11$i$N.

The LEO network manager 16$i$0 reports the relative satellite position information between the self-satellite and the adjacent satellite to which a radio beam is emitted by each of the satellite-to-satellite radio communication sections 12$i$0 to 12$i$M, the relative satellite speed information and the respective satellite-to-satellite beam numbers, to the satellite-to-satellite radio communication sections 12$i$0 to 12$i$M.

The LEO network manager 16$i$0 reports the LEO network configuration information, the first corresponding data and the second corresponding data, at the current time, to the connection manager 17$i$0.

The LEO network manager 16$i$0 reports the area number in the service area 4$i$ at the current time, the area number in the service area 4$i$ at the T_ho time, the relative position information between the self-satellite and the adjacent satellite at the T_ho time, and the relative satellite speed information at the T_ho time, to the hand-over manager 18$i$0.

The terminal-to-satellite radio communication sections 11$i$0 to 11$i$N have respective terminal-to-satellite radio beam numbers.

Each of the terminal-to-satellite radio communication sections 11$i$0 to 11$i$N specifies an emission point of the terminal-to-satellite radio beam, based on the relative satellite position information between the self-satellite and the respective areas and the relative satellite speed information outputted from the LEO network manager 16$i$0. Thus, each of the terminal-to-satellite radio communication sections 11$i$0 to 11$i$N always emits the beam to the same emission point even while the satellite is moving.

Each of the terminal-to-satellite radio communication sections 11i0 to 11iN carries out a radio communication between the terminal and the self-satellite. This embodiment employs the ROFA method as the method for emitting the beam between the terminal and the satellite.

Also, the satellite-to-satellite radio communication sections 12i0 to 12iM have respective satellite-to-satellite beam numbers. Each of the satellite-to-satellite radio communication sections 12i0 to 12iM specifies an emission point of the satellite-to-satellite radio beam, based on the relative position information between the self-satellite and the adjacent satellite and the relative satellite speed information outputted from the LEO network manager 16i0. Thus, each of the satellite-to-satellite radio communication sections 12i0 to 12iM always emits the radio beam to the same emission point even while the satellite is moving. Each of the satellite-to-satellite radio communication sections 12i0 to 12iM carries out a radio communication between the satellites.

The connection manager 17i0 manages a terminal-to-satellite connection information (described later), a satellite-to-satellite connection information (described later) and an ATM-SW conversion information (described later) with respective tables. The connection manager 1710 carries out a hand-over process. The connection manager 17i0 has a timer for counting a time for the pre-process of the hand-over process.

As for the connections between the terminal-to-satellite radio communication sections 11i0 to 11iN, th e satellite-to-satellite radio communication sections 12i0 to 12iM and the ATM-SW 19i0, the connection manager 17i0 sets the terminal-to-satellite connection information, the satellite-to-satellite connection information and the ATM-SW conversion information to the respective tables, based on the LEO network configuration information, the first and second corresponding data, at the current time reported by the LEO network manager 16i0.

FIGS. 3 to 5 show one example of the table management data (managed with the respective tables) of the connection manager 17i0. FIG. 3 shows a terminal-to-satellite connection information table of a connection management table. FIG. 4 shows a satellite-to-satellite connection information table of the connection management table. And, FIG. 5 shows an ATM-SW conversion information table of the connection management table.

The connection information shown in FIGS. 3 and 4 are the connection identifying information assigned between the terminal and the satellite and between the satellites, respectively. Each of the connection information shown in FIGS. 3 and 4 does not need to be equal between the terminals.

The terminal-to-satellite connection information is the information to identify a logical communication path (connection) set in a physical communication path between the terminal and the satellite. And, the satellite-to-satellite connection information is the information to identify a logical communication path (connection) set in a physical communication path between the satellites (also referred to as a satellite-to-satellite link).

Also, h indicates a value represented by using a hexadecimal number notation, CBR (Constant Bit Rate) indicates a fixed bit speed, VBR (Variable Bit Rate) indicates a variable bit speed, and UBR (Unspecified Bit Rate) indicates an undefined bit rate.

The hand-over manager 18i0 specifies an area requiring the hand-over process at the area unit at the T__ho time and a satellite to be the hand-over destination, based on the area number in the service area at the current time, the area number in the service area at the T__ho time, the relative position information (positions in x-axis, Y-axis and Z-axis directions with the self-satellite as the original point) between the self-satellite and the adjacent satellite and the relative satellite speed information (moving speeds in X-axis, Y-axis and Z-axis directions with the self-satellite as the original point), at the T__ho time, reported by the LEO network manager 16i0.

The hand-over manager 18i0 has a timer for counting a hand-over process setting time. The number of timers is T__ho/t (: integer). The hand-over processes described in this embodiment can be done in parallel, correspondingly to the number of timers.

The ATM-SW 19i0 carries out a process for exchanging an ATM cell, similarly to the ATM-SW in the existing ground ATM network. In this embodiment, as the input and output destinations to and from the ATM-SW 19i0, there are the terminal-to-satellite radio communication sections 11i0 to 11iN, the satellite-to-satellite radio communication sections 12i0 to 12iM, the connection manager 17i0 and the hand-over manager 18i0.

The satellite orbit calculator 14i0, the LEO network manager 16i0, the connection manager 17i0 and the hand-over manager 18i0 constituting the hand-over processing system 1 are provided in a computer system. A ROM (Read Only Memory) of the computer system store therein a program to execute the hand-over procedure of sequence steps shown in FIGS. 6 to 12. It is designed such that this program is read out from the ROM by the computer constituting the computer system and then executed by the computer to thereby carry out the processes in the hand-over procedure in the sequence steps shown in FIGS. 6 to 12.

The operations in this embodiment will be described below with reference to FIGS. 1 to 12. For the purpose of convenient illustration, the operations in this embodiment are described by exemplifying the case that the LEO network configuration has the following configuration.

Here, a procedure is described with regard to the hand-over process at the area unit when the hand-over of a ground terminal group in the area 210 (FIG. 2) in the satelite $2_1$ of the hand-over source to a satellite $2_2$ of the hand-over destination is carried out. Especially, the procedure is described with regard to a process for performing the hand-over on the connection between one terminal in the area 210 and the destination terminal of a ground terminal group receiving the communication service by a satellite $2_4$ in the skies of the destination terminal.

As shown in FIG. 1, respective terminal-to-satellite radio communication sections of the satellite $2_1$ of the hand-over source are referred by using reference numbers 1110 to 111N. Respective satellite-to-satellite radio communication sections of the satellite $2_1$ are referred by using reference numbers 1210 to 121M. A satellite orbit database of the satellite $2_1$ is referred by using a reference number 1310, a satellite orbit calculator of the satellite $2_1$ is referred by using a reference number 1410, an area database of the satellite $2_1$ is referred by using a reference number 1510, an LEO network manager of the satellite $2_1$ is referred by using a reference number 1610, a connection manager of the satellite $2_1$ is referred by using a reference number 1710, a hand-over manager of the satellite $2_1$ is referred by using a reference number 1810, and an ATM-SW of the satellite $2_1$ is referred by using a reference number 1910.

Respective terminal-to-satellite radio communication sections of the satellite $2_2$ of the hand-over destination are referred by using reference numbers 1120 to 112N. Respective satellite-to-satellite radio communication sections of the satellite $2_2$ are referred by using reference numbers 1220 to 122M. A satellite orbit database of the satellite $2_2$ is referred by using a reference number 1320, a satellite orbit calculator of the satellite $2_2$ is referred by using a reference number 1420, an area database of the satellite $2_2$ is referred by using a reference number 1520, an LEO network manager of the satellite $2_2$ is referred by using a reference number 1620, a connection manager of the satellite $2_2$ is referred by using a reference number 1720, a hand-over manager of the satellite $2_2$ is referred by using a reference number 1820, and an ATM-SW of the satellite $2_2$ is referred by using a reference number 1920.

In the above-mentioned LEO network, respective terminal-to-satellite radio communication sections of a middle satellite $2_3$ located between the satellite $2_1$ of the hand-over source or the satellite $2_2$ of the hand-over destination and the satellite $2_4$ in the skies of the destination terminal are referred by using reference numbers 1130 to 113N. Respective satellite-to-satellite radio communication sections of the middle satellite $2_3$ are referred by using reference numbers 1230 to 123M. A satellite orbit database of the middle satellite $2_3$ is referred by using a reference number 1330, a satellite orbit calculator of the middle satellite $2_3$ is referred by using a reference number 1430, an area database of the middle satellite $2_3$ is referred by using a reference number 1530, an LEO network manager of the middle satellite $2_3$ is referred by using a reference number 1630, a connection manager of the middle satellite $2_3$ is referred by using a reference number 1730, a hand-over manager of the middle satellite $2_3$ is referred by using a reference number 1830, and an ATM-SW of the middle satellite $2_3$ is referred by using a reference number 1930.

Respective terminal-to-satellite radio communication sections of the satellite $2_4$ in the skies of the destination terminal are referred by using reference numbers 1140 to 114N. Respective satellite-to-satellite radio communication sections of the satellite $2_4$ are referred by using reference numbers 1240 to 124M. A satellite orbit database of the satellite $2_4$ is referred by using a reference number 1340, a satellite orbit calculator of the satellite $2_4$ is referred by using a reference number 1440, an area database of the satellite $2_4$ is referred by using a reference number 1540, an LEO network manager of the satellite $2_4$ is referred by using a reference number 1640, a connection manager of the satellite $2_4$ is referred by using a reference number 1740, a hand-over manager of the satellite $2_4$ is referred by using a reference number 1840, and an ATM-SW of the satellite $2_4$ is referred by using a reference number 1940.

Now, the satellite $2_1$ while flying in the skies of the service area $4_1$ carries out the satellite communication with the terminal group existing in the areas 210 to 21N in the service area $4_1$. The satellite $2_1$ carries out the satellite-to-satellite communication with other satellite groups (Step 601 of FIG. 6).

The satellite $2_4$ in the skies of the destination terminal, while flying in the skies of the service area itself, carries out the satellite communication with the destination terminal in its service area. The satellite $2_4$ carries out the satellite-to-satellite communication with other satellite groups. Also, the terminal in the ground terminal group 3 in the area 210 communicates with the destination terminal through the LEO network (Step 602).

While this satellite $2_1$ is flying, the satellite orbit calculator 1410 of the satellite $2_1$ calculates the all-satellites position information (latitudes, longitudes and altitudes) and the all-satellites speed information (directions and speeds) at the current time and at the T__ho time for each time T, based on the information stored in the satellite orbit database 1310. The satellite orbit calculator 1410 reports their calculation results to the LEO network manager 1610 (Step 701 of FIG. 7).

Then, the LEO network manager 1610 determines LEO network configurations at the current time and at the T__ho time, to generate the LEO network configuration information at the current time and at the T__ho time, based on the all-satellites position information (latitudes, longitudes and altitudes) and the all-satellites speed information (directions and speeds) at the current time and at the T__ho time, received at the step 701 from the satellite orbit calculator 1410.

Also, the LEO network manager 1610 determines the service area at the current time and the service area at the T__ho time, based on the area data outputted from the area database 1510.

Also, the LEO network manager 1610 determines the terminal-to-satellite radio communication sections used for each area of the service area to generate the first corresponding data.

Moreover, the LEO network manager 1610 generates the relative position information (positions, X-axis, Y-axis and Z-axis directions with the self-satellite as the original point) between the self-satellite and the adjacent satellite and the relative satellite speed information (moving speeds in X-axis, Y-axis and Z-axis directions with the self-satellite as the original point), at the current time and at the T__ho time.

The LEO network manager 1610 determines the satellite-to-satellite radio communication sections to generate the second corresponding data.

The LEO network manager 1610 reports the thus-generated LEO network configuration information at the current time, the first and second corresponding data to the connection manager 1710 (Step 702). The LEO network manager 1610 also reports the area number group in the service area at the current time, the area number group at the T__ho time, the satellite identifier of the adjacent satellite at the T__ho time, the relative position information between the self-satellite and the adjacent satellite and the relative satellite speed information, to the hand-over manager 1810 (Step 703).

Moreover, the LEO network manager 1610, based on the area data from the area database 1510, generates the relative satellite position information (positions in X-axis, Y-axis and Z-axis directions with the position indicated by each area data as the original point) between each area and the self-satellite at the current time and the relative satellite speed information (moving speeds in X-axis, Y-axis and Z-axis directions with the position indicated be each area data as the original point).

The LEO network manager 1610 reports each terminal-to-satellite beam number, the relative satellite position information between each area and the self-satellite, and the relative satellite speed information, as each beam control data, to the terminal-to-satellite radio communication sections 1110 to 111N determined for each area (Step 704).

Similarly, the LEO network manager 1610 reports each satellite-to-satellite beam number, the relative position information between the adjacent satellite and the self-satellite and the relative satellite speed information at the current time, as each beam control data, to the satellite-to-satellite radio communication sections 1210 to 121M (Step 705).

Each of the terminal-to-satellite radio communication sections 1110 to 111N of the satellite $2_1$ identifies the information reported by the LEO network manager 1610 based on its terminal-to-satellite beam number. Each of the terminal-to-satellite radio communication sections 1110 to 111N specifies the emission point of the radio beam, based on the relative satellite position information between the self-satellite and each area and the relative satellite speed information reported by the LEO network manager 1610. Each of the terminal-to-satellite radio communication sections 1110 to 111N emits the radio beam to the specified emission point to carries out the radio communication between the terminal and the satellite (Step 706).

Similarly, each of the satellite-to-satellite radio communication sections 1210 to 121M of the satellite $2_1$ identifies the information reported by the LEO network manager 1610 based on its satellite-to-satellite beam number. Each of the satellite-to-satellite radio communication sections 1210 to 121M specifies the emission point of the satellite-to-satellite beam, based on the relative position information between the adjacent satellite and the self-satellite and the relative satellite speed information at the current time reported by the LEO network manager 1610. Each of the satellite-to-satellite radio communication sections 1210 to 121M emits the beam to the specified emission point to carry out the radio communication between the satellites (Step 707).

The hand-over manager 1810 of the satellite $2_1$ calculates (expects) the area that will be outside the service area at the T__ho time (in the explanation example in this operation, the calculated area becomes the area 210) and the adjacent satellite which will fly into the area 210 at a next time (the satellite $2_2$ in the explanation example in this operation), based on the area number group in the service area at the current time, the area number group at the T__ho time, the satellite identifier of the adjacent satellite at the T__ho time, the relative position information between the adjacent satellite and the self-satellite and the relative satellite speed information at the T__ho time, reported by the LEO network manager 1610.

For example, as shown in FIG. 13, there is no positional difference between the area 210 to which the satellite $2_1$ at the current time emits the radio beam and the area 210 to which the satellite $2_1$ at the T__ho time emits the radio beam. Thus, the area 210 is not calculated as the area that will be outside the service area $4_1$ at the T__ho time.

However, as shown in FIG. 14, there is a positional difference between the area 210 to which the satellite $2_1$ at the current time emits the radio beam and the area 210 to which the satellite $2_1$ at the T__ho time emits the radio beam. Hence, the area 210 is calculated as the area that will be outside the service area $4_1$ at the T__ho time.

The hand-over manager 1810 does not report a hand-over request to the connection manager 1710 if the area 210 is not calculated as the area that will be outside the service area $4_1$ at the T__ho time. However, the hand-over manager 1810 reports the hand-over request to the connection manager 1710 if the area 210 is calculated as the area that will be outside the service area $4_1$ at the T__ho time (Step 708). This report causes the hand-over process to be started.

The hand-over request includes the area number of the area 210 on which the hand-over process will be performed, the satellite identifier of the adjacent satellite $2_2$ of the hand-over destination and a hand-over timing information (=T__ho). The hand-over manager 1810, when carrying out the hand-over request, starts counting the timer.

The connection manager 1710, when receiving the hand-over request, generates the hand-over request information (hereafter, referred to as a HO__REQUEST information) based on the terminal-to-satellite connection information of the area 210 of that hand-over request. The connection manager 1710 ATM-transfers the HO__REQUEST information to the satellite (=satellite $2_2$) having the hand-over-requested satellite identifier (Steps 709, 710 of FIG. 7, Step 603 of FIG. 6).

The HO__REQUEST information includes a transmission source satellite identifier (=a satellite $2_1$ identifier), a destination satellite identifier (=a satellite $2_2$ identifier), an information identifier (=HO__REQUEST information), an area number information (=210), a terminal identifier, a terminal-to-satellite connection identifying information, a radio channel number, a terminal-to-satellite connection information, a satellite-to-satellite route information, and the hand-over timing information, with respect to the hand-over request.

Then, the terminal identifier, the terminal-to-satellite connection identifying information, the radio channel number, the terminal-to-satellite connection information and the satellite-to-satellite route information include the information of all connections on which the hand-over process will be performed with respect to the hand-over request. The satellite-to-satellite route information is the information with regard to the respective satellites from the satellite $2_1$ to the satellite $2_4$.

The connection manager 1720 of the satellite $2_2$, when receiving the HO__REQUEST information, considers an empty resource (the exchanging ability of the ATM-SW) of the self-satellite at the receiving time, to carry out a process for judging a reception of the terminal in the area 210-to-satellite connection.

As for the reception connection, the connection manager 1720 sets the terminal identifier, the terminal-to-satellite connection information, the radio channel number, and the terminal-to-satellite connection information to the terminal-to-satellite connection information table.

The explanation example of the operation in this embodiment has the premise that the beam is emitted for each area. So, if the hand-over of the connection to the satellite $2_1$ is performed on the satellite $2_2$, with the connection information of the connection, the satellite $2_2$ assigns a new beam to the area 210. As a result, the satellite $2_2$ can use the terminal identification, the terminal-to-satellite connection identifying information, the radio channel number and the satellite-to-satellite connection information, which are used in the satellite $2_1$, in their original states.

If one or more connections in the area 210 are received, the connection manager 1720 reports a beam set request to the LEO network manager 1620 (Step 811). The beam set request includes the area number included in the HO__REQUEST information.

The LEO network manager 1620 receiving the beam set request selects a non-used (spare) terminal-to-satellite radio communication section of the terminal-to-satellite radio communication sections 1120 to 112N to reserve for the area 210.

Next, the LEO network manager 1620 reports a beam set response to the connection manager 1720 (Step 812). The beam set response includes the requested area number and the beam number of the reserved terminal-to-satellite radio communication section. In the explanation example of the operation in this embodiment, the above-mentioned beam number=1120.

The process in the satellite $2_2$ of the hand-over destination when the connection to the hand-over request is received is done as follows.

The connection manager 1720 receiving the ATM-transferred HO__REQUEST information specifies the satellite $2_4$ in the skies of the destination terminal in each connection, based on the satellite-to-satellite route information included in the HO__REQUEST information. By the way, if the satellite $2_4$ in the skies of the destination terminal is the satellite $2_2$, the process for receiving that connection is ended (becomes at a state of receiving a CONNECTION information in the following explanation).

In succession, the connection manager 1720 generates the satellite-to-satellite route information up to the satellite $2_4$ in the skies of the destination terminal, based on the LEO network configuration information at the T_ho time reported by the LEO network manager 1620. The connection manager 1720 generates the satellite-to-satellite connection information between the satellite $2_2$ and the adjacent satellite $2_3$ of the satellite $2_2$, determined by the generated satellite-to-satellite route information.

Next, the connection manager 1720 generates a connection set information (hereafter, referred to as a SETUP information) for each connection in the area 210.

This SETUP information includes a transmission source satellite identifier (=the self-satellite identifier), a destination satellite identifier (=the adjacent satellite identifier specified by the satellite-to-satellite route information), an information identifier (=SETUP), the terminal identifier which is included in the HO_REQUEST information, a satellite-to-satellite connection identifying information, a satellite-to-satellite connection information and the satellite-to-satellite route information, with respect to the SETUP information.

After those processes, the connection manager 1720 ATM-transfers the SETUP information to the adjacent satellite indicated by the satellite-to-satellite route information (Steps 813, 814 of FIG. 9, Step 604 of FIG. 6). The connection manager 1720, when transmitting the SETUP information first, starts an operation of the timer. This timer is intended to count a hand-over process allowance time, and counts a time (the T_ho–$\alpha$) from 0. The T_ho is a value reported by the HO_REQUEST information. The $\alpha$ is a time in which a transmission delay between the satellite $2_1$ and the satellite $2_2$ is considered. The value of the $\alpha$ differs depending on the system.

The following processes are carried out in the adjacent satellite to which the SETUP information is ATM-transferred, namely, a middle satellite $2_3$ between the satellite $2_2$ and the satellite $2_4$ in the skies of the destination terminal, specified by the satellite-to-satellite route information.

When the middle satellite, namely, the adjacent satellite $2_3$ of the satellite $2_2$ of the hand-over destination receives the SETUP information (Step 604), the connection manager 1730 of the middle satellite $2_3$ identifies an information to the self-satellite $2_3$ based on the destination satellite identifier, and identifies the transmission source satellite and the information kind based on the transmission source satellite identifier and the information identifier (=SETUP).

The connection manager 1730, when receiving the SETUP information (Steps 908 to 910 of FIG. 10), judges whether or not the satellite-to-satellite connection is received between the self-satellite 23 and the ATM-transmission source $2_2$ of the SETUP information, based on the satellite-to-satellite connection information included in the SETUP information and an empty resource of the self-satellite.

If the connection manager 1730 receives the satellite-to-satellite connection requested by the SETUP information, the connection manager 1730 stores the satellite-to-satellite connection information. As described later, the satellite-to-satellite connection information is set if the CONNECTION information is received from the transmission destination $2_4$ of the SETUP information at the step 610. The satellite-to-satellite connection information is used after the reception of a tentative (provisional) set activation information (hereafter, referred to as an ACTIVATE information) at the step 619.

The connection manager 1730 newly generates a satellite-to-satellite connection identifying information between the self-satellite $2_3$ and the satellite $2_4$ adjacent to the self-satellite $2_3$ specified by the satellite-to-satellite route information, and a satellite-to-satellite connection information, with respect to the satellite-to-satellite connection between the self-satellite $2_3$ and the satellite $2_4$ to generate a SETUP information.

This SETUP information includes a transmission source satellite identifier (=$2_3$), a destination satellite identifier (=$2_4$), an information identifier (=SETUP), a terminal identifier included in the SETUP information received at the step 604, the generated satellite $2_3$-to-satellite $2_4$ connection identifying information, the generated satellite $2_3$-to-satellite $2_4$ connection information, and the satellite-to-satellite route information included in the SETUP information received at the step 604, with respect to the satellite-to-satellite connection between the self-satellite $2_3$ and the satellite $2_4$.

The generated SETUP information is sent to the satellite $2_4$ in the skies of the destination terminal that is the adjacent satellite specified by the satellite-to-satellite route information (Step 605 of FIG. 6, Steps 914 to 916 of FIG. 10).

The connection manager 1730 generates a set proceeding information (hereafter, referred to as a PROCEEDING information) to ATM-transfer to the transmission source satellite $2_2$ of the received SETUP information (Step 608 of FIG. 6, Steps 911, 912 of FIG. 10).

The PROCEEDING information includes a transmission source satellite identifier (=the self-satellite $2_3$ identifier), a destination satellite identifier (=the satellite identifier of the received SETUP information transmission destination $2_2$), an information identifier (=PROCEEDING), the terminal identifier included in the SETUP information received at the step 604, the satellite $2_2$-to-satellite $2_3$ connection identifying information included in the SETUP information received at the step 604, and the satellite $2_2$-to-satellite $2_3$ connection information.

Similarly to the above case, the connection manager 1740, after receiving the SETUP information from the satellite $2_3$ at the step 606, a PROCEEDING information to ATM-transfer to the transmission source satellite $2_3$ of the SETUP information received at the step 605 (Step 607 of FIG. 6).

If the satellite $2_2$-to-satellite $2_3$ connection requested by the SETUP information received at the step 604 is refused, the connection manager 1730 generates a refusal information (hereafter, referred to as a REFUSE information) to ATM-transfer to the adjacent satellite $2_2$ of the transfer source of the SETUP information received at the step 604.

The REFUSE information includes a transmission source satellite identifier (=the self-satellite identifier $2_3$), a destination satellite identifier (=the satellite identifier $2_2$ of the transmission source of the SETUP information received at the step 604), an information identifier (=REFUSE), the terminal identifier included in the SETUP information received at the step 604, the satellite $2_2$-to satellite $2_3$ connection identifying information included in the SETUP information received at the step 604, the satellite-to-satellite connection information and a refused reason, with respect to the REFUSE information transmitted from the satellite $2_3$ to the satellite $2_2$.

The refused reasons are as follows. For example, a requested VPI/VCI is under usage. A resource within the satellite $2_3$ is lacking. And, the hand-over process is being done. Here, the state that the hand-over process is being done implies the case that terminals in a certain connection are mutually executing the hand-over process. In this case, for example, in the satellites in the skies of the respective terminals, the hand-over process in which a value of the satellite identifier is larger is given the priority. Or, the hand-over process in which the value of the satellite identifier is small is given the priority. The hand-over process that is given the priority differs depending on the system.

The connection manager of the middle satellite $2_3$ or the satellite $2_2$ receiving the PROCEEDING information at the steps 607 and 608, for example, the connection manager 1730 judges that the satellite-to-satellite connection is under setting, and maintains its original state (Steps 917 to 919).

When the middle satellite $2_3$ receives the REFUSE information from the satellite $2_4$ (Steps 927, 928), the connection manager 1730 judges that the satellite $2_3$-to-satellite $2_4$ connection is refused to clear the stored connection information.

Similarly, the connection manager 1730 generates the REFUSE information to ATM-transfer to the transmission source satellite $2_2$ of the SETUP information received at the step 604 (Step 929 to 931).

The following processes are carried out by the satellite receiving the SETUP information from the middle satellite $2_3$, namely, the satellite $2_4$ in the skies of the destination terminal specified by the satellite-to-satellite route information.

The connection manager 1740, when receiving the SETUP information (Step 606 of FIG. 6, Steps 1008, 1009 of FIG. 12), judges whether or not the satellite $2_3$-to-satellite $2_4$ connection between the self-satellite $2_4$ and the satellite $2_3$ of the transfer source of the SETUP information received at the step 606, can be received, based on the satellite $2_3$-to-satellite $2_4$ connection information included in the SETUP information received at the step 606 and the empty resource of the self-satellite 24.

If the connection manager 1740 receives the satellite $2_3$-to-satellite $2_4$ connection requested by the SETUP information received at the step 606, the connection manager 1740 specifies the corresponding terminal-to-satellite connection, based on the terminal identifier included in the SETUP information received at the step 606 is received.

Next, the satellite $2_3$-to-satellite $2_4$ connection of the connection is tentatively set in the connection information specified by the SETUP information. That is to say, if the connection manager 1740 receives the satellite $2_3$-to-satellite $2_4$ connection requested by the SETUP information, the connection manager 1740 stores the satellite $2_3$-to-satellite $2_4$ connection information. In this state, the connection information received is only stored in the satellite $2_4$. This tentative setting does not become effective until the reception of the ACTIVATE information at the step 621. When the ACTIVATE information is received at the step 621, the connection information is set in the connection information table between the satellite and the satellite of the satellite $2_4$.

Next, the connection manager 1740 generates a connection set response information (hereafter, referred to as a CONNECT information) to ATM-transfer to the transmission source satellite (the middle satellite $2_3$) of the SETUP information received at the step 606 (Step 609 of FIG. 6, Steps 1010, 1011 of FIG. 12).

The CONNECT information includes a transmission source satellite identifier (=the self-satellite identifier $2_4$), a destination satellite identifier (=a satellite identifier of the transmission source $2_3$ of the SETUP information received at the step 606), an information identifier (=CONNECT), the terminal identifier included in the SETUP information received at the step 606, the satellite-to-satellite connection identifying information included in the SETUP information received at the step 606, and the satellite-to-satellite connection information.

Then, if the connection manager 1740 refuses the satellite $2_3$-to-satellite $2_4$ connection requested by the SETUP information received at the step 606, the connection manager 1740 generates the REFUSE information, similarly to the middle satellite $2_3$, to ATM-transfer to the transmission source satellite $2_3$ of the SETUP information received at the step 606 (Step 1010, 1011).

When the connection manager 1730 of the middle satellite $2_3$ receives the CONNECT information (Step 610 of FIG. 6, Steps 920 to 922 of FIG. 10), the connection manager 1730, after setting the stored connection between the self-satellite $2_3$ and the next satellite $2_4$, also sets the satellite-to-satellite connection between the self-satellite $2_3$ and the satellite $2_2$ at the former stage.

The connection manager 1730 generates the CONNECT information to ATM-transfer to the transmission source satellite $2_2$ of the SETUP information received at the step 604, similarly to the transmission of the PROCEEDING information (Steps 611, 923 to 925).

The CONNECT information includes a transmission source satellite identifier (=the self-satellite identifier $2_3$), a destination satellite identifier (=a satellite identifier of the transmission source satellite $2_2$ of the SETUP information received at the step 604), an information identifier (=CONNECT), the terminal identifier included in the SETUP information at the step 604, and the tentatively set connection identifying information between the self-satellite $2_3$ and the transmission source satellite $2_2$ of the SETUP information received at the step 604.

As mentioned above, when the connection manager 1720 of the satellite $2_2$ finally receives the CONNECT information (Step 611 of FIG. 6, Steps 818, 819 of FIG. 9), the connection setting process of the connection is ended. If the connection manager 1720 of the satellite $2_2$ receives the REFUSE information (Steps 818, 819), the connection manager 1720 carries out the re-setting in the same route, or selects another route, to similarly carry out the pre-process of the hand-over.

When the connection manager 1720 of the satellite $2_2$ finally receives the CONNECT information with regard to all the connections in the area 210 (Steps 818, 819), or when the timer counts the hand-over process allowance time, the pre-process of the hand-over of the area 210 is ended. If there is a connection of which the CONNECT information is not received within the count time of the timer, that hand-over of the connection can not be done since there is no hand-over destination.

In succession, the connection manager 1720 of the satellite $2_2$ ATM-transfers a hand-over result information (hereafter, referred to as a HO_RESULT information) to the connection manager 1710 of the satellite $2_1$ (Step 612 of FIG. 6, Steps 820 to 822 of FIG. 9).

This HO_RESULT information includes the area number information (=the area 210), the terminal identifier, the terminal-to-satellite connection identifying information, the radio channel number, the terminal-to-satellite connection information, reported by the HO_REQUEST information and a hand-over process result of the connection. The information with regard to all the connections on which the hand-over process is performed is included in the area number information, the terminal identifier, the terminal-tosatellite connection identifying information, the radio channel number, the terminal-to-satellite connection information, and the hand-over process result of the connection.

When the connection manager 1710 of the satellite $2_1$ receives the HO_RESULT information at the step 612 (Steps 712 to 714 of FIG. 7), the pre-process prior to the execution of the hand-over is ended.

Prior to the T_ho time after the execution of the pre-process, the connection manager 1710 of the satellite $2_1$ of the hand-over source generates a transient suspension of a beam emission (hereafter, referred to as a SUSPEND information) to report to the terminal group in the area 210 and the satellite $2_4$ in the skies of the destination terminal of each of the connections, by using a route currently being used (the previous route prior to the hand-over) (Steps 613, 614 of FIG. 6, Steps 715 to 720 of FIG. 7).

The connection manager of each satellite on the previous route, when receiving the SUSPEND information, ATM-transfers the SUSPEND information to the next satellite on the previous route (Steps 615, 616 of FIG. 6 and 950 to 954 of FIG. 11).

The SUSPEND information to the satellite $2_4$ in the skies of the destination terminal includes a transmission source satellite identifier (=the self-satellite identifier), a destination satellite identifier (=the satellite identifier in the skies of the destination terminal), an information identifier (=SUSPEND) and a terminal identifier.

Also, the SUSPEND information transmitted at the step 614 to each terminal in the area 210 includes a transmission source satellite identifier (=the self-satellite identifier $2_1$), the terminal identifier, an information identifier (=SUSPEND), a terminal-to-satellite $2_1$ connection identifying information, a radio channel number, and the terminal-to-satellite $2_1$ connection information.

When the satellite $2_4$ in the skies of the destination terminal receives the SUSPEND information, the satellite $2_4$ ATM-transfers the SUSPEND information to the terminal of the corresponding connection (Steps 616, 617 of FIG. 6, Steps 1012 to 1016 of FIG. 12).

The SUSPEND information to the terminal from the satellite $2_4$ includes a transmission source satellite identifier (the self-satellite identifier $2_4$), the terminal identifier, an information identifier (=SUSPEND), a terminal-to-satellite connection identifying information, a radio channel number, and a terminal-to-satellite connection information, with respect to the terminal to the satellite $2_4$.

When the terminal receives the SUSPEND information from the satellite $2_4$, the terminal stops the data transmission (Step 623 of FIG. 6, Step 1017 of FIG. 12).

After the elapse of the time T_ho from the time when the hand-over of the area 210 under the satellite $2_1$ is determined (the start time of the pre-process of the hand-over), the hand-over manager 1810 of the satellite $2_1$ sends a hand-over execution report of the area 210 to the connection manager 1710 (Step 721 of FIG. 7). The hand-over execution report includes the area number of the area 210 on which the hand-over is planed to be performed.

When the connection manager 1710 receives the hand-over execution report, the connection manager 1710 ATM-transfers an execution information (hereafter, referred to as an HO_RUN information) to the connection manager 1720 of the satellite 22 (Step 618 of FIG. 6, Steps 722, 723 of FIG. 7). At this time, the HO_RUN information is transmitted to the connection manager 1720 with respect to only the connection reported as a receivable connection by the HO_RESULT information.

The HO_RUN information includes a transmission source satellite identifier (=the self-satellite identifier $2_1$), a destination satellite identifier (=the satellite $2_2$), an information identifier (=HO_RUN), the area number information (=the area 210), the terminal identifier, the terminal-to-satellite connection identifying information, the radio channel number, and the terminal-to-satellite connection information, with respect to the hand-over of the area 210.

The connection manager 1720 of the satellite $2_2$ receiving the HO_RUN information (Step 618 of FIG. 6, Steps 823, 824 of FIG. 9) validates the set connection setting. Next, the connection manager 1720 generates the ACTIVATE information for each connection on which the hand-over is planed to be performed. The connection manager 1720 ATM-transfers the generated ACTIVATE information to the connection manager 1730 of the adjacent satellite $2_3$ specified by the satellite-to-satellite route information (Step 619 of FIG. 6, Steps 825 to 827 of FIG. 9).

The ACTIVATE information includes a transmission source satellite identifier (=the self-satellite identifier $2_2$), a destination satellite identifier (=the adjacent satellite identifier $2_3$), an information identifier (=ACTIVATE), a satellite $2_2$-to-satellite $2_3$ connection identifying information, and a satellite $2_2$-to-satellite $2_3$ connection information.

The connection manager 1740 of the satellite $2_4$ and the connection manager 1730 of the middle satellite $2_3$, when receiving the ACTIVATE information (Steps 619, 620, 621 of FIG. 6), validate the connection setting set in the self-satellite $2_4$, $2_3$, respectively. Also, the connection manager 1740 invalidates the satellite-to-satellite connection setting prior to the hand-over execution.

After the connection setting is validated, the middle satellite $2_3$ generates the ACTIVATE information to the next adjacent satellite $2_4$ to ATM-transfer to the satellite $2_4$ (Step 620 of FIG. 6, Steps 935 to 937 of FIG. 11).

When the connection manager 1740 of the satellite $2_4$ finished the needed process in response to the ACTIVATE information received at the step 621 (Steps 1018 to 1020 of FIG. 12), the connection manager 1740 sends a resumption information (hereafter, referred to as a RESUME information) to the terminal of the corresponding connection (Step 621R of FIG. 6, Steps 1023 to 1025 of FIG. 12).

The RESUME information includes a transmission source satellite identifier (=the self-satellite identifier $2_4$ ), the terminal identifier, an information identifier (=RESUME), an area number information, a terminal identifier, a terminal-to-satellite connection identifying information, a radio channel number, and a terminal-to-satellite connection information, with respect to the terminal of the corresponding connection.

Then, when the terminal receives the RESUME information, the terminal resumes the data transmission (Steps 621R, 631 of FIG. 6, Step 1026 of FIG. 12).

Also, when the connection manager 1740 of the satellite $2_4$ finished the needed process in response to the ACTIVATE information received at the step 621, the connection manager 1740 ATM-transfers an activation response information (hereafter, referred to as an ACTIVATE_ACK information) to the satellite $2_3$ of the transmission source satellite of the ACTIVATE information received at the step 621 (Step 624 of FIG. 6, Steps 1021, 1022 of FIG. 12).

The ACTIVATE_ACK information includes a transmission source satellite identifier (=the self-satellite identifier $2_4$), a destination satellite identifier (=the ACTIVATE transmission source satellite identifier $2_3$ ), an information identifier (=ACTIVATE_ACK), a satellite-to-satellite connection identifying information, and a satellite-to-satellite connection information, with respect to the connection between the satellites $2_3$, $2_4$.

Then, when the connection manager 1730 of the middle satellite $2_3$ receives the ACTIVATE_ACK information (Step 625 of FIG. 6, Steps 938 to 940 of FIG. 11), the connection manager 1730 similarly ATM-transfers the ACTIVATE_ACK information to the satellite $2_2$ of the transmission source satellite of the ACTIVATE information received at the step 619 (Steps 625, 626 of FIG. 6, Steps 941 to 943 of FIG. 11).

When the connection manager 1720 of the satellite $2_2$ receives the ACTIVATE_ACK information with regard to all the connections on which the hand-over is planed to be performed (Steps 828, 829 of FIG. 9), the connection manager 1720 performs a service start request of the area 210 on the LEO network manager 1620 (Step 830 of FIG. 9). The service start request includes the area number of the area 210.

The connection manager 1720 generates a hand-over completion information (hereafter, referred to as a HO_COMPLETE information) to ATM-transfer to the satellite $2_1$ (Step 627 of FIG. 6).

The HO_COMPLETE information includes a transmission source satellite identifier (=the self-satellite identifier $2_2$), a destination satellite identifier (=the satellite $2_1$), an information identifier (=HO_COMPLETE), the area number information, the terminal identifier, a terminal-to-satellite connection identifying information, a radio channel number, and a terminal-to-satellite connection information, with respect to the hand-over to be performed.

The information of all the connections on which the hand-over is planed to be performed is included in the terminal identifier, the terminal-to-satellite connection identifying information, the radio channel number, and the terminal-to-satellite connection information.

When the connection manager 1710 of the satellite $2_1$ receives the HO_COMPLETE information (Step 627 of FIG. 6, Steps 724, 725 of FIG. 7), the connection manager 1710 performs a service stop request of the area 210 on the LEO network manager 1610 (Step 726).

So, the LEO network manager 1610 invalidates the relative satellite position information (positions in X-axis, Y-axis and Z-axis directions with the position indicated by each area data 210 as the original point) between the self-satellite $2_1$ and each area 210 and the relative satellite speed information (moving speeds in X-axis, Y-axis and Z-axis directions with the position indicated by each area data 210 as the original point), to the terminal-to-satellite radio communication section 1110 for the area 210 (Step 730 of FIG. 7). Thus, the beam emission from the satellite $2_1$ to the area 210 is stopped (Step 628 of FIG. 6, Step 731 of FIG. 7).

The information with regard to the connection information in which the hand-over is refused employs the manner in which the report is not done in this embodiment. However, if even the information with regard to the connection information in which the hand-over is refused is reported to the satellite $2_1$, the satellite $2_2$ includes, in addition to the terminal identifier, the terminal-to-satellite connection identifying information, the radio channel number and the terminal-to-satellite connection information, an information as to whether or not the hand-over can be received. This information is an information indicating whether or not the hand-over is received.

When the LEO network manager 1620 receives the service start request at the step 830, the LEO network manager 1620 reports the relative satellite position information between the self-satellite $2_2$ and the area 210 and the relative satellite speed information of the area 210, to the terminal to satellite radio communication section 1120 reserved (scheduled to be used) (Step 831 of FIG. 9). So, the satellite $2_2$ starts emitting the beam to the area 210 (Step 629 of FIG. 6, Step 832 of FIG. 9).

The connection manager 1720 of the satellite $2_2$ reports the RESUME information to the terminal group in the area 210 (Step 630 of FIG. 6). The RESUME information includes a transmission source satellite identifier (=the self-satellite identifier $2_2$), the terminal identifier, an information identifier (=RESUME), the area number information (=210), a terminal-to-satellite connection identifying information, a radio channel number, and a terminal-to-satellite connection information, with respect to the connection at the area 210 on which the hand-over is performed to the satellite $2_2$.

Then, when the terminal receives the RESUME information, the terminal resumes the data transmission (Step 632 of FIG. 6).

The connection manager 1710 releases all the settings in the area 210. Next, the connection manager 1710 ATM-transfers a setting release information (hereafter, referred to as a RELEASE information) to the adjacent satellite on the previous route prior to the hand-over (Step 633 of FIG. 6, Steps 724, 728 of FIG. 7).

The RELEASE information includes a transmission source satellite identifier (=the self-satellite identifier $2_1$), a destination satellite identifier (=the ACTIVATE transmission source satellite identifier), an information identifier (=RELEASE), a satellite-to-satellite connection identifying information, and a satellite-to-satellite connection information.

The connection manager in each satellite (the middle satellite or the satellite in the skies of the destination terminal) on the previous route, which receives the RELEASE information, releases the connection reported by the RELEASE information (Steps 944 to 946 of FIG. 11). When the connection manager finishes the process for releasing the connection in response to the received RELEASE information, the connection manager ATM-transfers the RELEASE information to the adjacent satellite on the previous route (Steps 947 to 949).

The above-detailed procedure enables the hand-over of the terminal group in the area 210 of the satellite $2_1$ from the satellite $2_1$ to the satellite $2_2$, in the LEO network in this embodiment.

As mentioned above, according to the configuration in this embodiment, it is designed as follows.

That is, in accordance with the positions and the speeds of the communication satellite at the time of the start of the hand-over process and after the elapse of the time necessary for the hand-over process from the start, the area targeted for the hand-over in the LEO network is expected before the elapse of the time for each communication satellite.

The LEO network configuration is expected at the time of the hand-over execution. And, the connection information at the area unit from the satellite $2_2$ of the hand-over destination to the satellite $2_4$ in the skies of the destination terminal is expected before the elapse of the time, in accordance with the expected LEO network configuration.

Then, the terminal-to-satellite connection information at the area unit receiving the communication service from the satellite $2_1$ of the hand-over source is reported from the satellite $2_1$ of the hand-over source to the satellite $2_2$ of the hand-over destination. The process for setting the spare terminal-to-satellite connection information at the hand-over destination $2_2$ is carried out. Also, the process for setting the expected connection information is carried out. The set connection information is validated in the case of the elapse of the time (at the timing of the hand-over execution). So, the communication services with regard to the terminals within the area 210 targeted for the hand-over are simultaneously taken over by the satellite $2_2$ of the hand-over destination by using the electric wave emitter 1120 at the spare terminal of the satellite $2_2$ of the hand-over destination. Thus, the amount of the control information between the terminal and the satellite can be dropped over the case in which the hand-over is done at an individual terminal such as the conventional technique. Moreover, it is possible to reduce the processing time when the hand-over is executed.

If the hand-over process is executed at the area unit, since this case employs the configuration in which the beams are prepared correspondingly to the number of areas within the service area, the terminal-to-satellite connection information prior to the hand-over can be used as the terminal-to-satellite connection information after the hand-over. Thus, it is possible to further reduce the processing time at the time of the hand-over execution.

(Second Embodiment)

Figure 15:
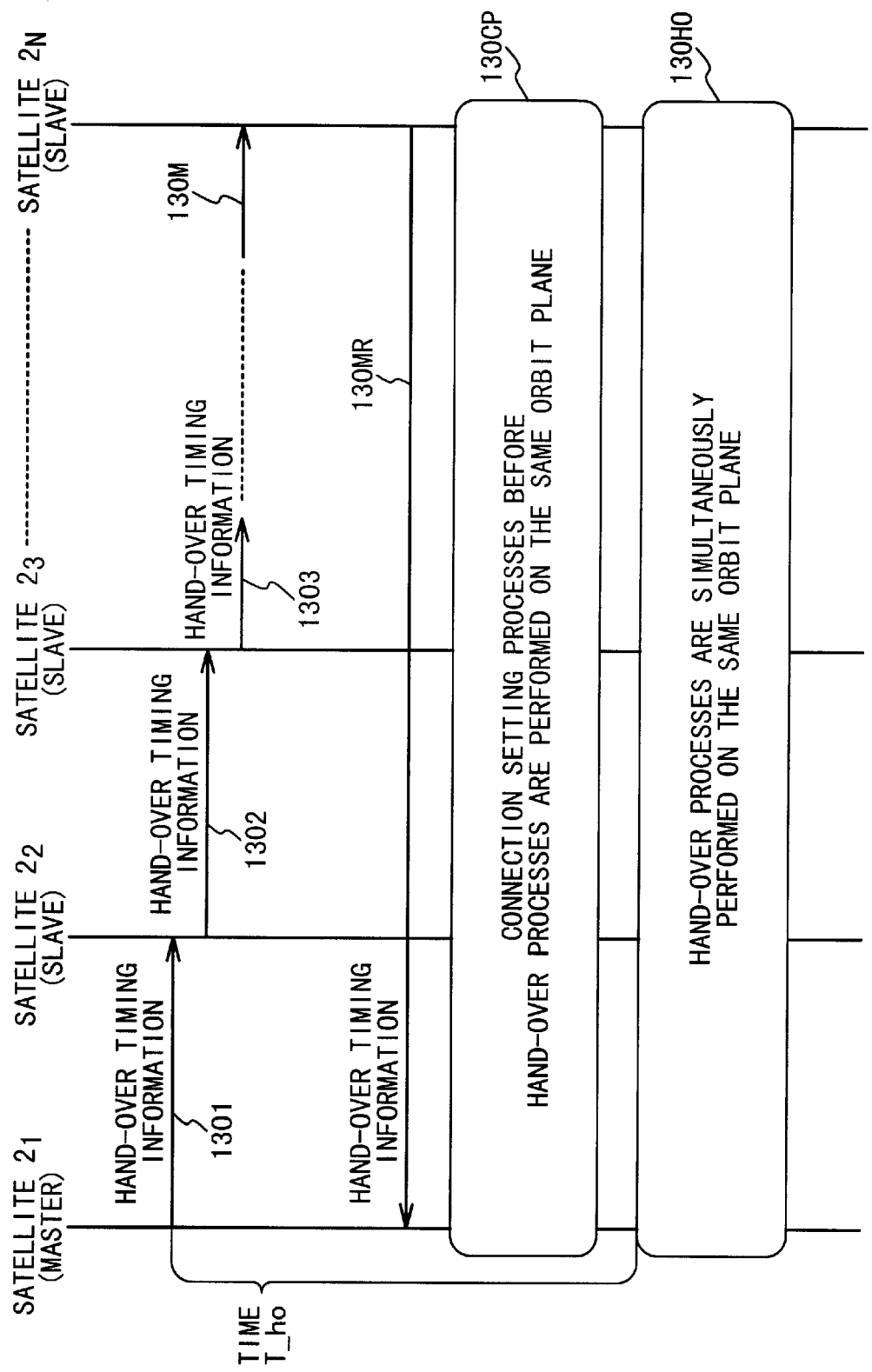
FIG. 15 is a view showing a method for reporting a hand-over timing information in a hand-over processing system in an LEO network that is a second embodiment of the present invention.
Figure 16:
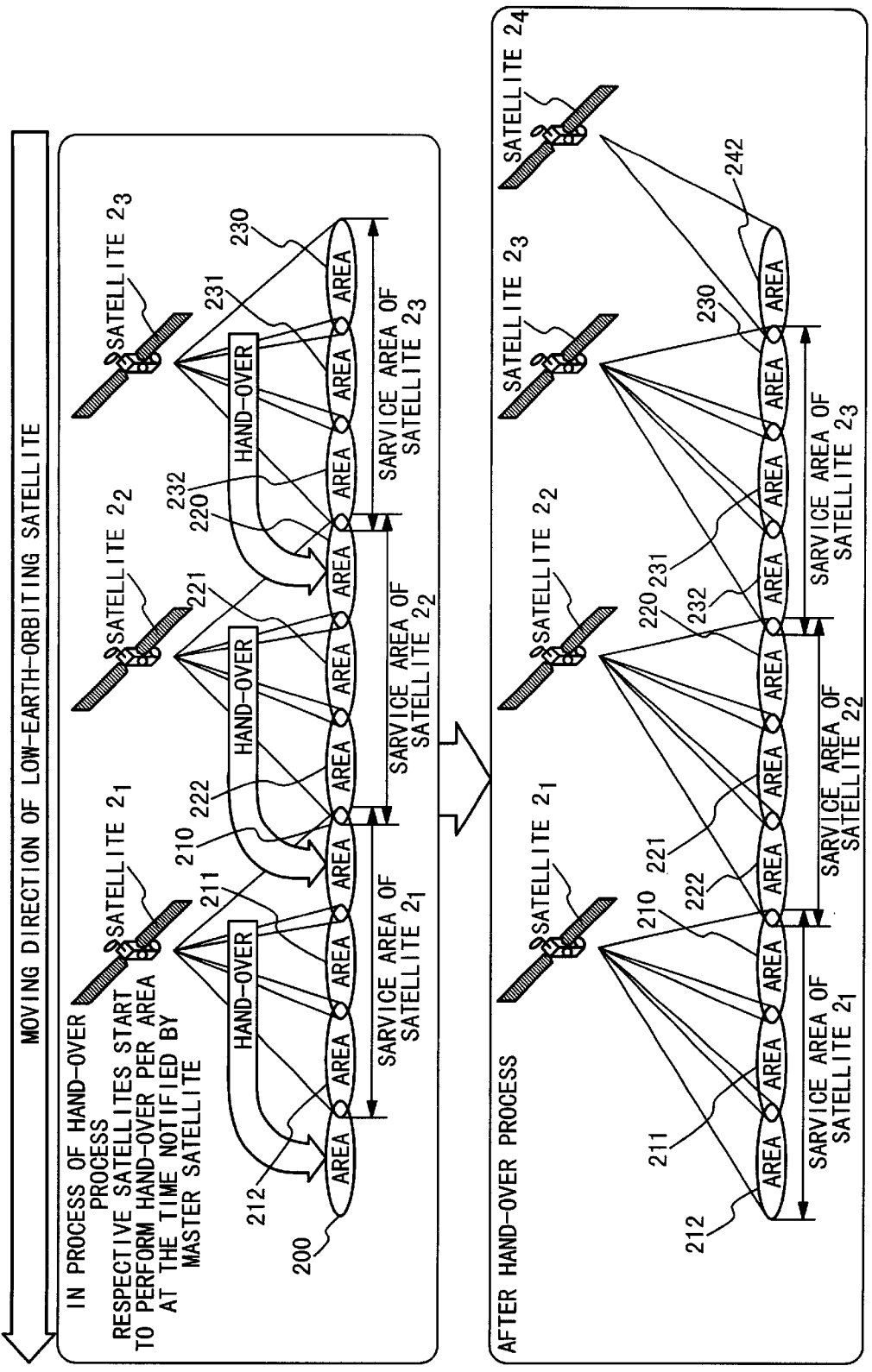
FIG. 16 is a concept view of a hand-over carried out at an area unit in the hand-over processing system.

FIG. 15 is a view showing a method for reporting a hand-over timing information in a hand-over processing system in an LEO network that is a second embodiment of the present invention. And, FIG. 16 is a concept view showing a hand-over carried out at an area unit in the hand-over processing system.

The large difference in the configuration of this embodiment from that of the first embodiment lies in the fact that the hand-over at the area unit can be done even if the satellite $2_2$ of the hand-over destination does not have the spare (empty) radio beam emitter.

That is, a standard station is mounted within the LEO network. This standard station sends a hand-over execution timing information to respective low-Earth-orbiting satellites. So, the operations within the satellite are made synchronous with each other so that the respective low-Earth-orbiting satellites in the LEO network are operated in synchronization with each other. The standard station employs, for example, the configuration in which a facility for sending the hand-over execution timing information to each low-Earth-orbiting satellite is mounted on a ground below each orbit plane of the LEO network, or the configuration of using GPS (Global Positioning System).

One satellite in a satellite group within the same orbit plane of low-Earth-orbiting satellites is used as a master satellite. The master satellite calculates the hand-over execution timing information for each time T (this time T has the same meaning as the time in the first embodiment) to send to respective slave satellites other than the master satellite of the satellite group.

The master satellite in this configuration calculates the hand-over execution timing information for each time T to report to one of satellites adjacent to the master satellite within the same orbit plane. The adjacent satellite receiving the hand-over execution timing information reports the hand-over execution timing information to a satellite adjacent to the received adjacent satellite. Thus, this has the configuration that all the low-Earth-orbiting satellites within a certain orbit plane can have the single timing when the hand-over is executed.

Due to such configuration, the low-Earth-orbiting satellites are synchronous with each other under the standard station. Thus, at a certain time t, all the low-Earth-orbiting satellites within the same orbit plane can simultaneously start the hand-over processes.

Also in this embodiment, the hand-over manager 18$i$0 in each low-Earth-orbiting satellite 2$i$ sends and receives the hand-over execution timing information.

By the way, except the above-mentioned points, the configuration in this example is equal to that of the first embodiment. So, it is not shown. The illustration in FIG. 1 is used in its original state. And, the same symbols are given to the respective members equal to those of FIG. 1. Thus, the explanations thereof are omitted.

The operations of this embodiment will be described below with reference to FIGS. 15 and 16.

The hand-over execution timing information of the master satellite is sequentially reported to the slave satellites (Steps 130l to 130M of FIG. 15). By the way, the step 130MR is intended to note the completion of the report of the hand-over execution timing to the master satellite $2_1$.

The pre-setting processes of the connections on which the hand-overs are planed to be performed are done before a time indicated by the reported hand-over execution timing information, similarly to the first embodiment (Step 130CP). At the time indicated by the hand-over execution timing information after the presetting processes, each low-Earth-orbiting satellite executes the hand-over process described in the first embodiment (Step 130HO).

Then, when each satellite starts the hand-over process, each satellite stops emitting the beam to the area of which the hand-over is performed under the self-satellite to start emitting the beam to the other area of which the other hand-over is performed under the other satellite.

FIG. 16 illustrates the described hand-overs. An area 200 located within the service area of a satellite in the front stage of the satellite $2_1$ during the hand-over process (as IN PROCESS OF HAND-OVER PROCESS in shown FIG. 16), an area 210 within the service area receiving the communication service from the satellite $2_1$ during the hand-over process, an area 220 within the service area receiving the communication service from the satellite $2_2$ during the hand-over process, and an area 230 within the service area receiving the communication service from the satellite $2_3$ during the hand-over process receive the communication services from the satellite $2_1$, the satellite $2_2$, the satellite $2_3$ and the satellite $2_4$, respectively, after the hand-over process (as AFTER HAND-OVER PROCESS in shown FIG. 16).

As mentioned above, according to the configuration in this embodiment, it is not necessary to prepare the spare beam emitter as compared with the first embodiment. Thus, it is possible to reduce the equipment size of the satellite.

Also, the number of hand-over target areas is limited to the number of spare beam emitters, in the case of the first embodiment. However, this embodiment does not have such limitation. Thus, the number of hand-over target areas can be freely set when the system is designed.

(Third Embodiment)

Figure 17:
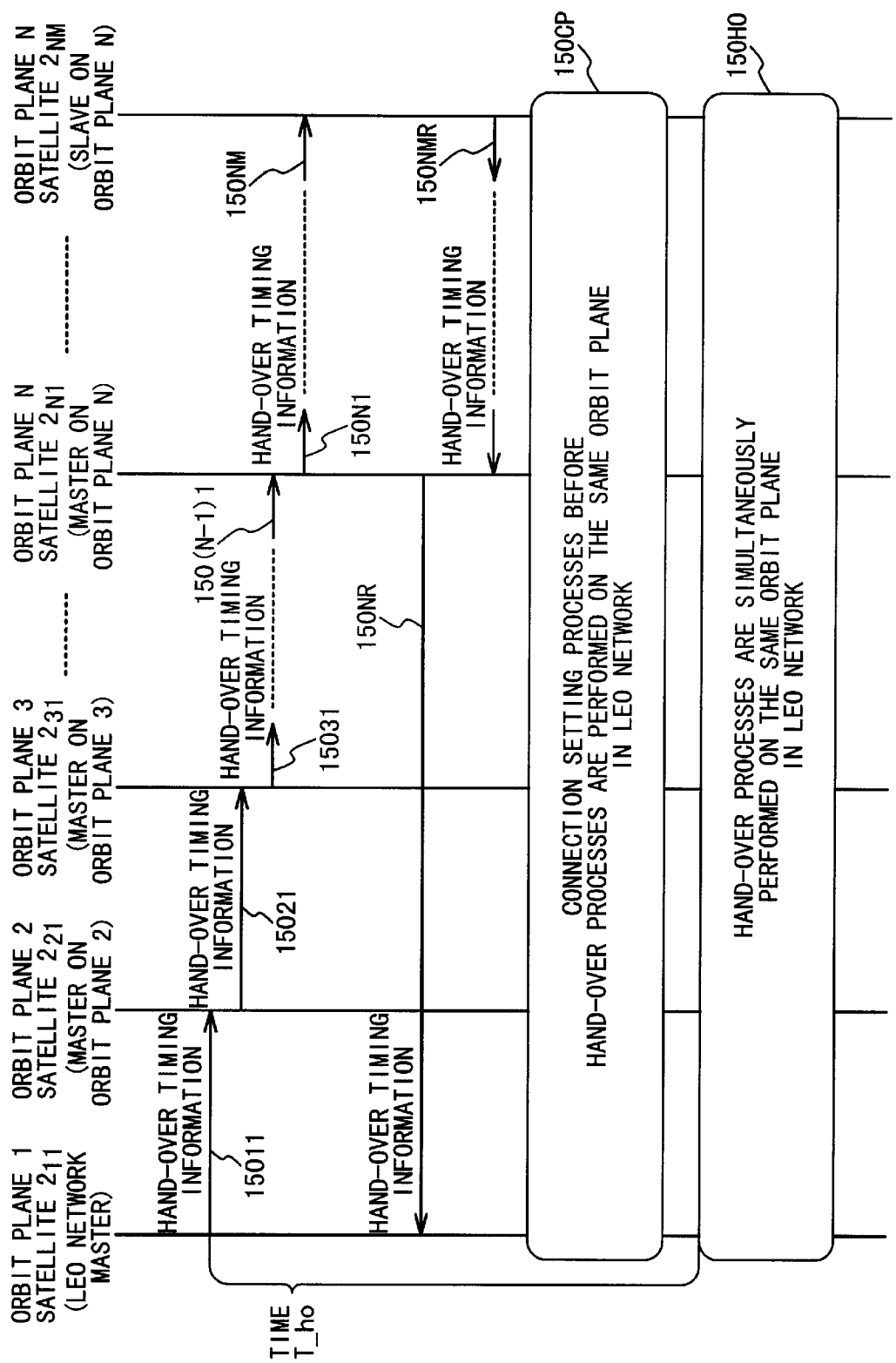
FIG. 17 is a view showing a method for reporting a hand-over execution timing information in a hand-over processing system in an LEO network that is a third embodiment of the present invention.

FIG. 17 is a view showing a method for reporting a hand-over execution timing information in a hand-over processing system in an LEO network that is a third embodiment of the present invention.

The large difference in the configuration of this embodiment from that of the first embodiment lies in the fact that the hand-over at the area unit can be executed between a plurality of orbit planes.

That is, the LEO network in the second embodiment does not have a special condition when selecting the master satellite in each orbit plane. However, the master satellite in each orbit plane in this embodiment is selected as follows.

Each orbit plane in the LEO network is an orbit plane of a polar orbit or an orbit plane having an angle that is slightly inclined from the polar orbit. Thus, the satellites located on the orbit planes are close to each other near the pole. So, a satellite moving near the pole is always assumed to be the master satellite of each orbit. If a certain master satellite gets away from near the pole, a satellite next approaching the vicinity of the pole on the orbit plane becomes the master satellite. So, a certain orbit plane of the orbit planes is set in advance as a master orbit. The master satellite on the master orbit becomes the master satellite in the LEO network.

The master satellite on this master orbit calculates the hand-over execution timing information.

By the way, except the above-mentioned points, the configuration in this example is equal to that of the first embodiment. So, it is not shown. The illustration in FIG. 1 is used in its original state. And, the same symbols are given to the respective members equal to those of FIG. 1. Thus, the explanations thereof are omitted.

The operations in this embodiment will be described below with reference to FIG. 17.

A master satellite on a master orbit (a satellite $2_{11}$ on an orbit plane 1) (a master satellite on an LEO network) calculates the hand-over execution timing information.

The master satellite $2_{11}$ reports the hand-over execution timing information to a master satellite $2_{21}$ on the adjacent orbit plane (Step 15011 of FIG. 17). The master satellite $2_{21}$ receiving the hand-over execution timing information transfers the hand-over execution timing information to a master satellite $2_{31}$ on the further adjacent orbit (Step 15021).

In this way, the master satellites $2_{11}$ to $2_{N1}$ on all orbits in the LEO network have the same hand-over execution timing information. By the way, a step 15ONR is intended to note the completion of the report of the hand-over execution timing information to the master satellite $2_{11}$.

Next, the master satellite on each of the orbit planes receiving the hand-over execution timing information reports the hand-over standard information to the slave satellites on the self-orbit plane, similarly to the explanation in the second embodiment. For example, the hand-over execution timing is sequentially reported from a satellite $2_{N1}$ to next satellites $2_{N2}$ to $2_{NM}$ (Steps 150N1 to 150NM). By the way, a step 150NMR is intended to note the completion of the report of the hand-over execution timing to the master satellite $2_{N1}$.

The procedures (Steps 150CP to 150HO) after that are similar to those of the second embodiment. The procedures at the steps 150CP to 150HO are similar to those at the steps 130CP to 130HO of FIG. 15.

As mentioned above, according to the configuration in this embodiment, it is possible to execute the hand-over processes synchronous with each other in the entire LEO network. The execution of the hand-over processes synchronous with each other between the satellites within one orbit plane as described in the second embodiment can be expanded between different orbit planes. Moreover, the hand-over at the area unit can be executed even between the different orbit planes.

(Fourth Embodiment)

Figure 18:
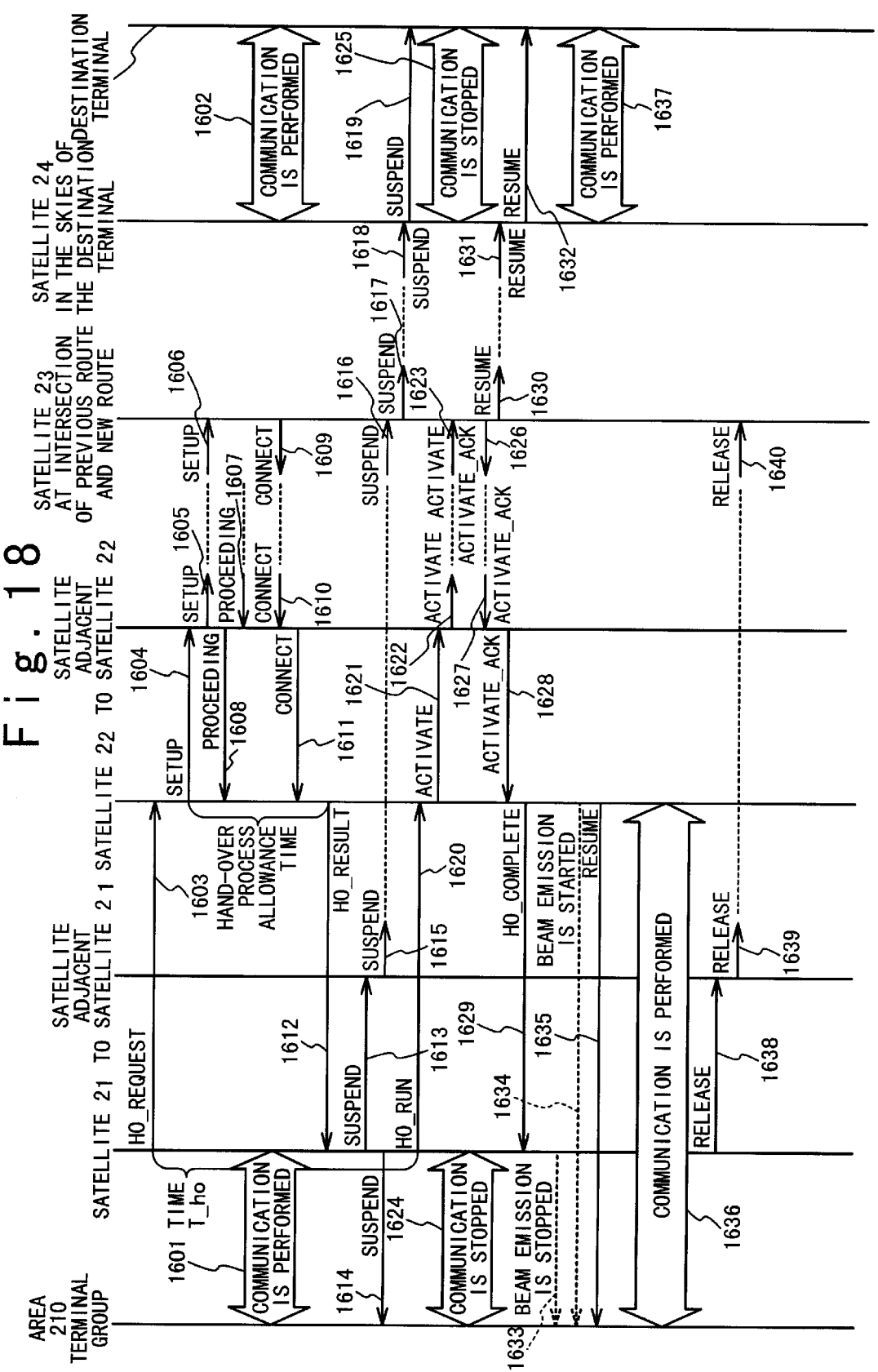
FIG. 18 is a time sequence chart showing sequence steps between a satellite and a satellite in a hand-over processing system in an LEO network that is a fourth embodiment of the present invention.

FIG. 18 is a time sequence chart showing sequence steps between satellites in a hand-over processing system in an LEO network that is a fourth embodiment of the present invention.

The large difference in the configuration of this embodiment from that of the first embodiment lies in the fact that the hand-over process is performed on only the changed portion in the hand-over process.

That is, in the first embodiment, when a previous middle satellite $2_3$ provided on a precious route prior to the hand-over from the hand-over source $2_1$ to the satellite $2_4$ in the skies of the destination terminal is equal to a new middle satellite $2_3$ provided on a new route after the hand-over from the hand-over destination $2_2$ to the satellite $2_4$ in the skies of the destination terminal, a connection is newly set from the satellite $2_2$ of the hand-over destination to the equal middle satellite $2_3$, of the connection from the satellite $2_2$ of the hand-over destination to the satellite $2_4$ in the skies of the destination terminal.

The connection from the middle satellite $2_3$ to the satellite $2_4$ in the skies of the destination terminal is used even after the hand-over.

By the way, except the above-mentioned points, the configuration in this example is equal to that of the first embodiment. So, it is not shown. The illustration in FIG. 1 is used in its original state. And, the same symbols are given to the respective members equal to those of FIG. 1. Thus, the explanations thereof are omitted. Also, the timing sequence of FIG. 18 has the sequence steps having the same contents as the timing sequence in FIG. 6. So, in those sequence steps, the fact is pointed out in the explanation of the operations described below. Thus, the explanations are not repeated with regard to those sequence steps.

The operations in this embodiment will be described below with reference to FIGS. 6 and 18.

In this embodiment, only the portion different from the first embodiment is described in the procedures of the case in which when the hand-over is executed at the area unit in the LEO network, only the connection is newly set from the satellite $2_2$ of the hand-over destination to the middle satellite $2_3$ serving as an intersection of the previous route (the route from the satellite $2_1$ of the hand-over source to the middle satellite $2_3$) and the new route (the route from the satellite $2_2$ of the hand-over destination to the middle satellite $2_3$), and then, the connection between the satellite $2_4$ in the skies of the destination terminal and the middle satellite $2_3$ serving as the intersection of the previous route and the new route is used even after the hand-over.

The step numbers are given to only the different portions in the following explanation. However, the detailed explanation is not done for the same portions. Thus, the step numbers are not given to the respective same portions in the explanation. So, the step numbers about the non-explained portions are listed as follows.

Steps 1601, 1602 shown in FIG. 18 are equal to the steps 601, 602 in FIG. 6. Steps 1607, 1608 and steps 1610 to 1615 are equal to the steps 607, 608 and the steps 610 to 615. A step 1618 is equal to the step 618. Steps 1620 to 1622 are equal to the steps 620 to 622. A step 1624 is equal to the step 624. Steps 1627 to 1629 are equal to the steps 627 to 629. Steps 1633 to 1636 are equal to the steps 633 to 636. And, steps 1638, 1639 are equal to the steps 638, 639.

When the communication satellite $2_2$ at the hand-over destination receives the HO_REQUEST information from the communication satellite $2_1$ at the hand-over source (Step 1603 of FIG. 18), the connection manager 1720 of the satellite $2_2$ determines the route of each connection after the hand-over, similarly to the first embodiment.

At this time, it is possible to detect the presence or absence of the satellite $2_3$ serving as the intersection of the previous route and the newly determined route (new route), by comparing the satellite-to-satellite route information included in the HO_REQUEST information with the satellite-to-satellite route information generated by the connection manager 1720.

If there is the satellite $2_3$ serving as the intersection of the previous route and the newly determined route, the connection manager 1720 generates a satellite-to-satellite route information up to the satellite $2_3$ serving as the intersection, and then generates the SETUP information, and further sends the SETUP information to an adjacent satellite $2_5$ (Step 1604)

When the satellite $2_3$ serving as the intersection of the previous route and the new route receives the SETUP information (Steps 1605, 1606), the satellite $2_3$ can identify that the satellite $2_3$ is the farthest satellite $2_3$ from the satellite $2_2$ since the final information indicated by the satellite-to-satellite route information is the self-satellite $2_3$.

This satellite $2_3$ can identify that the terminal on the connection does not exist in the self-service area $2_3$, based on the information in a satellite-to-satellite connection management table within the self-satellite $2_3$. As a result, this satellite $2_3$ can identify that satellite $2_3$ becomes the satellite $2_3$ at the intersection of the previous route and the new route.

If the satellite $2_3$ receives the connection requested by the SETUP information, the satellite $2_3$ returns the CONNECT information (Step 1609), and if refusing, returns the REFUSE information.

Then, the processes at the steps 1612 to 1616 are done in which the SUSPEND information are transmitted in response to the HO RESULT information. Those steps are equal to the steps 612 to 616 described in FIG. 6. However, the process at the steps 1615 and 1616 are different from the case of FIG. 6 which describes the process at the satellite $2_4$ in the skies of the destination terminal. In the process at the steps 1615 and 1616, the SUSPEND information is sent to the satellite $2_3$ at the intersection of the route prior to the hand-over (previous route) and the route after the hand-over (new route).

The satellite $2_3$, when receiving the SUSPEND information (Step 1616), sends the SUSPEND information to the satellite $2_4$ in the skies of the destination terminal, by using the satellite-to-satellite route between the self-satellite $2_3$ and the satellite $2_4$ in the skies of the destination terminal (Step 1617).

When the satellite $2_4$ in the skies of the destination terminal receives the SUSPEND information, the satellite $2_4$ generates the SUSPEND information to the terminal, similarly to the first embodiment, to send to the terminal (Step 1619). Then, the data transmission from the destination terminal to the satellite $2_4$ is stopped (Step 1625).

The satellite $2_3$, when receiving the ACTIVATE information (Step 1623), validates the connection tentatively set within the self-satellite $2_3$, and also invalidates the connection before the hand-over.

Similarly to the first embodiment, the satellite $2_3$ returns the ACTIVATE_ACK information through the communication satellite adjacent to the satellite $2_2$ of the hand-over destination to the satellite $2_2$ (Steps 1626, 1627, 1628).

The satellite $2_3$ generates the RESUME information to send to the satellite $2_4$ in the skies of the destination terminal, by using the satellite-to-satellite route between the self-satellite $2_3$ and the satellite $2_4$ in the skies of the destination terminal (Step 1630). The satellite $2_4$ in the skies of the destination terminal, when receiving the RESUME information (Step 1631), generates the RESUME information to the terminal, similarly to the first embodiment, to send to the terminal (Step 1632). Accordingly, the data transmission from the destination terminal to the satellite $2_4$ is resumed (Step 1637).

The satellite $2_3$, when receiving the RELEASE information, releases all the connection settings prior to the hand-over (Step 1640).

As mentioned above, according to the configuration in this embodiment, only the connection is newly set from the satellite $2_2$ of the hand-over destination to the middle satellite $2_3$ serving as the intersection of the previous route and the new route. Then, the connection between the middle satellite $2_3$ serving as the intersection of the previous route and the new route and the satellite $2_4$ in the skies of the destination terminal is used even after the hand-over. Thus, the process for setting the connection between the middle satellite $2_3$ and the satellite $2_4$ in the skies of the destination terminal is not required. Hence, the process time of the hand-over process can be reduced by the time corresponding to that setting process.

(Fifth Embodiment)

FIG. 19 is a view showing a hand-over processing system in an LEO network in an LEO network that is a fifth embodiment of the present invention.

The large difference in the configuration in this embodiment from that of the first embodiment lies in the fact that the common portion of the hand-over process is not installed in the respective communication satellites.

That is, the satellite orbit database $13i0$, the satellite orbit calculator $14i0$, the area database $15i0$, the LEO network manager $16i0$ and the hand-over manager $18i0$, which are mounted in the communication satellite $2i$ in the first embodiment, are mounted as a satellite orbit database 1300, a satellite orbit calculator 1400, an area database 1500, an LEO network manager 1600 and a hand-over manager 1800, on a ground station 5, for example, as shown in FIG. 19.

The hand-over processes at the area units are collectively managed. Then, the ground station 5 reports the information provided by the single LEO network manager 1600 and hand-over manager 1800, which are mounted in the ground station 5, to the respective satellites $2i$.

Also, the connection manager $17i0$, the ATMSW $19i0$, the satellite-to-satellite radio communication sections $12i0$ to $12iM$ and the terminal-to-satellite radio communication sections $11i0$ to $11iN$ are mounted in each satellite $2i$. Moreover, terminal-to-satellite radio communication sections $S11i1$ to $S11i2$ are mounted in each satellite $2i$ for the sake of communication between the ground station 5 and each satellite $2i$. On the other hand, terminal-to-satellite radio communication sections $E11i1$ to $E11i2$ are mounted in the ground station 5.

The operations in this embodiment will be described below with reference to FIG. 19.

The ground station 5 starts the hand-over process, and executes the hand-over processing procedure similar to the hand-over process in the first to fourth embodiments.

Accordingly, the connection that the communication satellite $2_2$ of the hand-over destination takes over from the communication satellite $2_1$ of the hand-over source in the LEO network is set in advance in such a way that the communication satellite $2_2$ of the hand-over destination can take over the connection, before the communication satellite $2_1$ of the hand-over source can not provide the communication service in its service area 210.

The communication service to the preset connection is taken over at the hand-over execution timing determined in accordance with the flying communication satellites $2_1$, $2_2$ at the hand-over source and the hand-over destination and the area 210 to which the hand-over is applied.

In this way, according to the configuration in this embodiment, the hand-over processes are collectively managed by the ground station 5. Thus, it is possible to protect the collision phenomenon that the mutual terminals in a certain connection simultaneously execute the hand-over process.

As mentioned above, the embodiments of the present invention have been described in detail with reference to the drawings. However, the actual configuration of the present invention is not limited to those embodiments. The modifications and adaptations on the design without departing from the scope and spirit of the present invention are included in the present invention.

For example, all the embodiments describe the hand-over in the LEO network. However, the present invention can be applied to even an MEO (Middle Earth Orbit) network.

In the explanation of the operations in the first embodiment, for the convenience of illustration, the case is used in which based on the area number group in the service area at the current time, the area number group at the T_ho time, the satellite identifier of the adjacent satellite at the T_ho time, the relative position information between the self-satellite and the adjacent satellite at the T_ho time, and the relative satellite speed information at the T_ho time, reported by the LEO network manager 1610, the area that will be outside the service area at the T_ho time calculated by the hand-over manager 1810 (the hand-over manager of the satellite $2_1$) and the adjacent satellite next flying into the area are defined as the area 210 and the satellite $2_2$, respectively, and then, one spare electrical wave emitter of the satellite $2_2$ is used to carry out the hand-over to the satellite $2_2$ of the area 210.

However, a plurality of spare electrical wave emitters of the satellite $2_2$ can be used to simultaneously carry out the hand-over processes from a plurality of hand-over target areas in the service area $4_1$ to the satellite $2_2$ at the area unit, respectively.

As mentioned above, according to the configuration of the present invention, for the area that is outside the service area under the satellite for each satellite of the hand-over source, prior to the completion of the hand-over process in which the satellite of the hand-over destination takes over the communication service in the area from the satellite of the hand-over source, the hand-over process is started such that the satellite of the hand-over destination takes over the communication service of the area. Thus, the hand-over process is not started by the terminal in the area, differently from the conventional technique. The hand-over process can be started by the satellite of the hand-over source according to the present invention.

If a hand-over execution timing indicative of the elapse of the time is prepared, and at the hand-over execution timing, spare electrical wave emitters for each satellite emit radio beams to the areas to thereby carry out the simultaneous hand-over at the area unit, it is possible to suppress the large increase in the amount of the control information at the time of the hand-over process and also possible to largely reduce the process time of the hand-over process.

Also, if the hand-over execution timing is prepared by a master satellite on the same orbit plane, and then, the hand-over execution timing is reported to other satellites on the same orbit plane to thereby carry out the simultaneous hand-over at the area unit, this configuration does not require the spare electrical wave emitter, and it is helpful for the miniaturization of the equipment size of the satellite. Moreover, the number of areas in the hand-over can be freely set when the system is designed.

If the hand-over execution timing is prepared by a master satellite on a polar orbit plane among a plurality of orbit planes, and then, the hand-over execution timing is reported to a master satellite on another orbit plane to thereby carry out the simultaneous hand-over at the area unit, it is possible to carry out the hand-over at the area unit between the satellites on different orbit planes.

Also, if only the connection up to the middle satellite is again set which requires the change of the connection associated with the hand-over from the satellite of the hand-over destination, it is possible to omit the process for setting the connection from the middle satellite to the satellite in the skies of the destination terminal. Thus, the process time of the hand-over process can be reduced by the time corresponding to the omission.

Also, if the common member necessary for the hand-over process mounted in each satellite is mounted on the ground station, it is possible to largely simplify the equipment size of the satellite and also possible to avoid the collision in the hand-over process.

What is claimed is:

1. A hand-over processing method, comprising:
   (a) providing a first satellite providing a communication service to a service area having a plurality of areas at a first time;
   (b) detecting, of said plurality of areas, an area as a specific outside a service area to which said first satellite provides said communication service at a second time when a predetermined time elapsed after said first time;
   (c) detecting a second satellite providing said communication service to said specific area at said second time;
   (d1) transmitting a hand-over request from said first satellite to perform a hand-over of said specific area to said second satellite, wherein said hand-over request includes a connection information with respect to a communication through said first satellite of a first terminal at said specific area;
   (d2) setting a first connection information with respect to a communication between said first satellite and said first terminal to a information with respect to a communication between said second satellite and said first terminal provisionally, wherein said connection information includes said first connection information;
   (d3) detecting a fourth satellite providing a communication service to a second terminal on the other end of said communication of said first terminal based on said connection information;
   (e) judging whether or not said hand-over can be performed in response to said hand-over request to transmit said judging result to said first satellite; and
   (f) performing said hand-over based on said judging result.

2. A hand-over processing method according to claim 1, wherein said (f) includes performing said hand-over at said second time.

3. A hand-over processing method according to claim 1, wherein said specific area on which said hand-over is performed includes a plurality of connections of a plurality of terminals at said specific area, and
   wherein said hand-over is performed on said plurality of connections at a same time.

4. A hand-over processing method according to claim 1, wherein said predetermined time corresponds to a time needed to perform said hand-over after said hand-over request is transmitted.

5. A hand-over processing method according to claim 1, wherein said (b) and (c) steps include detecting said specific area and said second satellite respectively based on a first data indicating positions of said first and second satellites at said first time and a second data indicating positions of said first and second satellites at said second time.

6. A hand-over processing method according to claim 1, wherein said (b) and (c) steps are performed at a ground station other than said first satellite.

7. A hand-over processing method according to claim 1, wherein said second satellite includes a plurality of second beam emitting units, said plurality of second beam emitting units being able to emit beams to said plurality of areas respectively, and wherein said second satellite reserves one which is not used of said plurality of second beam emitting units when said hand-over request is transmitted to said second satellite, and wherein said reserved second beam emitting unit emits a beam to said specific area when said hand-over is performed.

8. A hand-over processing method according to claim 1, wherein said first satellite includes a plurality of first beam emitting units, said plurality of first beam emitting units emitting beams to said plurality of areas respectively, and wherein said second satellite includes a plurality of second beam emitting units, said plurality of second beam emitting units being able to emit beams to said plurality of areas respectively.

9. A hand-over processing method according to claim 8, wherein said first satellite has a first connection information with respect to a communication between said first satellite and a first terminal at said specific area, and wherein said second satellite uses said first connection information as a information with respect to a communication between said second satellite and said first terminal when said hand-over is performed.

10. A hand-over processing method, comprising:

(g) providing a first satellite providing a communication service to a service area having a plurality of areas at a first time;

(h) detecting, of said plurality of areas, an area as a specific area outside a service area to which said first satellite provides said communication service at a second time when a predetermined time elapsed after said first time;

(i) detecting a second satellite providing said communication service to said specific area at said second time;

(j) transmitting a hand-over request from said first satellite to perform a hand-over of said specific area to said second satellite, wherein said hand-over request includes a connection information with respect to a communication through said first satellite of a first terminal at said specific area;

(k) setting a first connection information with respect to a communication between said first satellite and said first terminal to a information with respect to a communication between said second satellite and said first terminal provisionally, wherein said connection information includes said first connection information;

(l) detecting a fourth satellite providing a communication service to a second terminal on the other end of said communication of said first terminal based on said connection information;

(m) provisionally setting a second connection to perform a communication between said second satellite and said fourth satellite;

(n) transmitting a provisional setting notification that said second connection is set provisionally to said second satellite;

(o) judging said hand-over can be performed when said provisional setting notification is transmitted to transmit said judging result to said first satellite; and (p) performing said hand-over based on said judging result, wherein said hand-over is performed with using said first connection information and said second connection.

11. A hand-over processing method, comprising:

(q) providing a first satellite providing a communication service to a service area having a plurality of areas at a first time;

(r) detecting, of said plurality of areas, an area as a specific area outside a service area to which said first satellite provides said communication service at a second time when a predetermined time elapsed after said first time;

(s) detecting a second satellite providing said communication service to said specific area at said second time;

(t) transmitting a hand-over request from said first satellite to perform a hand-over of said specific area to said second satellite, wherein said hand-over request includes a connection information with respect to a communication through said first satellite of a first terminal at said specific area;

(u) setting a first connection information with respect to a communication between said first satellite and said first terminal to a information with respect to a communication between said second satellite and said first terminal provisionally, wherein said connection information includes said first connection information;

(v) detecting a fourth satellite providing a communication service to a second terminal on the other end of said communication of said first terminal based on said connection information;

(w) detecting a third satellite positioned between said second satellite and said fourth satellite;

(x) provisionally setting a first connection to perform a communication between said second satellite and said third satellite;

(y) provisionally setting a second connection to perform a communication between said third satellite and said fourth satellite;

(z) transmitting a provisional setting notification that said first and second connections are set provisionally to said second satellite;

(aa) judging said hand-over can be performed when said provisional setting notification is transmitted to transmit said judging result to said first satellite; and (ab) performing said hand-over based on said judging result, wherein said hand-over is performed with using said first connection information and said first and second connections.

12. A hand-over processing method, comprising:

(ac) providing a first satellite providing a communication service to a service area having a plurality of areas at a first time;

(ad) detecting, of said plurality of areas, an area as a specific area outside a service area to which said first satellite provides said communication service at a second time when a predetermined time elapsed after said first time;

(ae) detecting a second satellite providing said communication service to said specific area at said second time;

(af) transmitting a hand-over request from said first satellite to perform a hand-over of said specific area to said second satellite, wherein said hand-over request includes a connection information with respect to a communication through said first satellite of a first terminal at said specific area;

(ag) setting a first connection information with respect to a communication between said first satellite and first terminal to a information with respect to a communication between said second satellite and said first terminal provisionally, wherein said connection information includes said first connection information;

(ah) detecting a fourth satellite providing a communication service to a second terminal on the other end of said communication of said first terminal based on said connection information;

(ai) detecting a third satellite positioned between said second satellite and said fourth satellite;

(aj) provisionally setting a first connection to perform a communication between said second satellite and said third satellite to transmit a provisional setting notification that said first connection is set provisionally to said second satellite;

(ak) judging whether or not a second connection provided between said third satellite and said fourth satellite is used when said first terminal communicates with said second terminal at said first time;

(am) determining said hand-over can be performed when said provisional setting notification is transmitted if said second connection is judged to be used as result of said (ak) to transmit said determining result to said first satellite; and (an) performing said hand-over based on said determining result, wherein said hand-over is performed with using said first connection information and said first and second connections.

13. A hand-over processing method, comprising:

(ao) providing a first satellite, a second satellite and a third satellite, wherein said first, second and third satellites move in a same orbit with each other and each of said first, second and third satellites provides a communication service to a service area having a plurality of areas at a first time;

(ap) detecting, of said plurality of areas of said service area of said first satellite, an area as a first specific area outside a service area to which said first satellite provides said communication service at a second time when a first predetermined time elapsed after said first time;

(aq) detecting said second satellite providing said communication service to said first specific area at said second time;

(ar) transmitting a first hand-over request from said first satellite to perform a first hand-over of said first specific area to said second satellite;

(as) judging whether or not said first hand-over can be performed in response to said first hand-over request to generate a first judging result;

(at) transmitting said first judging result to said first satellite;

(au) performing said first hand-over based on said first judging result;

(av) detecting, of said plurality of areas of said service area of said second satellite, an area as a second specific area outside a service area to which said second satellite provides said communication service at a third time when a second predetermined time elapsed after said first time;

(aw) detecting said third satellite providing said communication service to said second specific area at said third time;

(ax) transmitting a second hand-over request from said second satellite to perform a second hand-over of said second specific area to said third satellite;

(ay) judging whether or not said second hand-over can be performed in response to said second hand-over request to generate a second judging result;

(az) transmitting said second judging result to said second satellite;

(ba) performing said second hand-over based on said second judging result; and (bb) performing said first and second hand-overs in synchronization with each other.

14. A hand-over processing method according to claim 13, further comprising:

(bc) setting one of said first, second, and third satellites as a master satellite; and (bd) transmitting a notify indicating of a perfoming time to perform said first and second hand-overs from said master satellite to ones of said first, second and third satellites other than said master satellite, and wherein said first and second hand-overs are performed at said performing time.

15. A hand-over processing method, comprising:

(be) providing a first satellite, a second satellite and a third satellite, wherein said first, second and third satellites move in a same first orbit with each other and each of said first, second and third satellites provides a communication service to a service area having a plurality of areas at a first time;

(bf) providing a fourth satellite, a fifth satellite and a sixth satellite, wherein said fourth, fifth and sixth satellites move in a same second orbit with each other and each of said fourth, fifth and sixth satellites provides a communication service to a service area having a plurality of areas at a second time;

(bg) detecting, of said plurality of areas of said service area of said first satellite, an area as a first specific area outside a service area to which said first satellite provides said communication service at a third time when a first predetermined time elapsed after said first time;

(bh) detecting said second satellite providing said communication service to said first specific area at said third time;

(bi) transmitting a first hand-over request from said first satellite to perform a first hand-over of said first specific area to said second satellite;

(bj) judging whether or not said first hand-over can be performed in response to said first hand-over request to generate a first judging result;

(bk) transmitting said first judging result to said first satellite;

(bl) performing said first hand-over based on said first judging result;

(bm) detecting, of said plurality of areas of said service area of said second satellite, an area as a second specific area outside a service area to which said second satellite provides said communication service at a fourth time when a second predetermined time elapsed after said first time;

(bn) detecting said third satellite providing said communication service to said second specific area at said fourth time;

(bo) transmitting a second hand-over request from said second satellite to perform a second hand-over of said second specific area to said third satellite;

(bp) judging whether or not said second hand-over can be performed in response to said second hand-over request to generate a second judging result;

(bq) transmitting said second judging result to said second satellite;

(br) performing said second hand-over based on said second judging result;

(bs) detecting, of said plurality of areas of said service area of said fourth satellite, an area as a third specific area outside a service area to which said fourth satellite provides said communication service at a fifth time when a third predetermined time elapsed after said second time;

(bt) detecting said fifth satellite providing said communication service to said third specific area at said fifth time;

(bu) transmitting a third hand-over request from said fourth satellite to perform a third hand-over of said third specific area to said fifth satellite;

(bv) judging whether or not said third hand-over can be performed in response to said third hand-over request to generate a third judging result;

(bw) transmitting said third judging result to said fourth satellite;

(bx) performing said third hand-over based on said third judging result;

(by) detecting, of said plurality of areas of said service area of said fifth satellite, an area as a fourth specific area outside a service area to which said fifth satellite provides said communication service at a sixth time when a fourth predetermined time elapsed after said second time;

(bz) detecting said sixth satellite providing said communication service to said fourth specific area at said sixth time;

(ca) transmitting a fourth hand-over request from said fifth satellite to perform a fourth hand-over of said fourth specific area to said sixth satellite;

(cb) judging whether or not said fourth hand-over can be performed in response to said fourth hand-over request to generate a third judging result;

(cc) transmitting said third judging result to said fifth satellite;

(cd) performing said fourth hand-over based on said third judging result; and (ce) performing said first, second, third and fourth hand-overs in synchronization with each other.

16. A hand-over processing method according to claim 15, further comprising:

(cf) setting one of said first, second and third satellites as a network master;

(cg) setting one of said fourth, fifth and sixth satellites as a non-network master;

(ch) transmitting a notify indicating of a performing time to perform said first, second, third and fourth hand-overs from said network master to said non-network master;

(ci) transmitting said notify from said network master to ones of said first, second and third satellites other than said network master; and (cj) transmitting said notify from said non-network master to ones of said fourth, fifth and sixth satellites other than said non-network master; and wherein said first, second, third and fourth hand-overs are performed at said performing time.

17. A hand-over processing method according to claim 16, wherein each orbit plane of said first and second orbits is one of a first plane of a polar orbit and a second plane having an angle which is slightly inclined from said polar orbit, and wherein said (cf) includes setting one moving near the pole of said first, second and third satellites as said network master and said (cg) includes setting one moving near the pole of said fourth, fifth and sixth satellites as said non-network master.

18. A hand-over processing method, comprising:

(ch) providing a first satellite providing a communication service to a service area at a first time;

(ci) detecting a specific area outside a service area to which said first satellite provides said communication service at a second time when a predetermined time elapsed after said first time;

(cj) detecting a second satellite providing said communication service to said specific area at said second time;

(ck1) transmitting a hand-over request from said first satellite to perform a hand-over of a connection of a terminal communicating at said specific area to said second satellite, wherein said hand-over request includes a connection information with respect to a communication through said first satellite of a first terminal at said specific area;

(ck2) setting a first connection information with respect to a communication between said first satellite and said first terminal to a information with respect to a communication between said second satellite and said first terminal provisionally, wherein said connection information includes said first connection information;

(ck3) detecting a fourth satellite providing a communication service to a second terminal on the other end of said communication of said first terminal based on said connection information;

(cl) judging whether or not said hand-over can be performed in response to said hand-over request to transmit said judging result to said first satellite; and (cm) performing said hand-over based on said judging result.

19. A hand over processing system, comprising:

a first satellite providing a communication service to a service area having a plurality of areas at a first time;

a first detecting unit detecting, of said plurality of areas, an area as a specific area outside a service area to which said first satellite provides said communication service at a second time when a predetermined time elapsed after said first time; and a second detecting unit detecting a second satellite providing said communication service to said specific area at said second time, and wherein said first satellite transmits a hand-over request to perform a hand-over of said specific area to said second satellite, said hand-over request including a connection information with respect to a communication through said first satellite of a first terminal at said specific area, and wherein said second satellite sets a first connection information with respect to a communication between said first satellite and said first terminal to a information with respect to a communication between said second satellite and said first terminal provisionally, said connection information including said first connection information and detects a fourth satellite providing a communication service to a second terminal on the other end of said communication of said first terminal based on said connection information, and wherein said second satellite judges whether or not said hand-over can be performed in response to said hand-over request to transmit said judging result to said first satellite, and wherein said first satellite performs said hand-over based on said judging result.

20. A hand-over processing system according to claim 19, wherein said first satellite performs said hand-over at said second time.

21. A hand-over processing system according to claim 19, wherein said specific area on which said hand-over is performed includes a plurality of connections of a plurality of terminals at said specific area, and wherein said first satellite performs said hand-over on said plurality of connections at a same time.

22. A hand-over processing system according to claim 19, wherein said predetermined time corresponds to a time needed to perform said hand-over after said hand-over request is transmitted.

23. A hand-over processing system according to claim 19, wherein said first and second detecting units include detecting said specific area and said second satellite respectively based on a first data indicating positions of said first and second satellites at said first time and a second data indicating positions of said first and second satellites at said second time.

24. A hand-over processing system according to claim 19, wherein said first and second detecting units are provided in a ground station.

25. A hand-over processing system according to claim 19, wherein said second satellite includes a plurality of second beam emitting units, said plurality of second beam emitting units being able to emit beams to said plurality of areas respectively, and wherein said second satellite reserves one which is not used of said plurality of second beam emitting units when said hand-over request is transmitted to said second satellite, and wherein said reserved second beam emitting unit emits a beam to said specific area when said hand-over is performed.

26. A hand-over processing system according to claim 19, wherein said first satellite includes a plurality of first beam emitting units, said plurality of first beam emitting units emitting beams to said plurality of areas respectively, and wherein said second satellite includes a plurality of second beam emitting units, said plurality of second beam emitting units being able to emit beams to said plurality of areas respectively.

27. A hand-over processing system according to claim 26, wherein said first satellite has a first connection information with respect to a communication between said first satellite and a first terminal at said specific area, and wherein said second satellite uses said first connection information as a information with respect to a communication between said second satellite and said first terminal when said hand-over is performed.

28. A hand-over processing system, comprising:
a first satellite providing a communication service to a service area having a plurality of areas at a first time;
a first detecting unit detecting, of said plurality of areas, an area as a specific area outside a service area to which said first satellite provides said communication service at a second time when a predetermined time elapsed after said first time; and
a second detecting unit detecting a second satellite providing said communication service to said specific area at said second time, and
wherein said first satellite transmits a hand-over request to perform a hand-over of said specific area to said second satellite, said hand-over request including a connection information with respect to a communication through said first satellite of a first terminal at said specific area, and
wherein said second satellite sets a first connection information with respect to a communication between said first satellite and said first terminal to a information with respect to a communication between said second satellite and said first terminal provisionally, said connection information including said first connection information and detects a fourth satellite providing a communication service to a second terminal on the other end of said communication of said first terminal based on said connection information, and
wherein said fourth satellite provisionally sets a second connection to perform a communication between said second satellite and said fourth satellite and transmits a provisional setting notification that said second connection is set provisionally to said second satellite, and
wherein said second satellite judges said hand-over can be performed when said provisional setting notification is transmitted to transmit said judging result to said first satellite and
wherein said first satellite performs said hand-over based on said judging result, said hand-over being performed with using said first connection information and said second connection.

29. A hand-over processing system, comprising:
a first satellite providing a communication service to a service area having a plurality of areas at a first time;
a first detecting unit detecting, of said plurality of areas, an area as a specific area outside a service area to which said first satellite provides said communication service at a second time when a predetermined time elapsed after said first time; and
a second detecting unit detecting a second satellite providing said communication service to said specific area at said second time, and
wherein said first satellite transmits a hand-over request to perform a hand-over of said specific area to said second satellite, said hand-over request including a connection information with respect to a communication through said first satellite of a first terminal at said specific area, and
wherein said second satellite sets a first connection information with respect to a communication between said first satellite and said first terminal to a information with respect to a communication between said second satellite and said first terminal provisionally, said connection information including said first connection information and detects a fourth satellite providing a communication service to a second terminal on the other end of said communication of said first terminal based on said connection information and detects a third satellite positioned between said second satellite and said fourth satellite, and
wherein said third satellite provisionally sets a first connection to perform a communication between said second satellite and said third satellite to transmit a first provisional setting notification that said first connection is set provisionally to said second satellite, and wherein said fourth satellite provisionally sets a second connection to perform a communication between said third satellite and said fourth satellite to transmit a second provisional setting notification that said second connection is set provisionally to said third satellite, and wherein said third satellite transmits said second provisional setting notification to said second satellite, and wherein said second satellite judges said hand-over can be performed when said first and second provisional setting notifications are transmitted to transmit said judging result to said first satellite, and wherein said first satellite performs said hand-over based on said judging result, said hand-over being performed with using said first connection information and said first and second connections.

30. A hand-over processing system, comprising:

a first satellite providing a communication service to a service area having a plurality of areas at a first time;

a first detecting unit detecting, of said plurality of areas, an area as a specific area outside a service area to which said first satellite provides said communication service at a second time when a predetermined time elapsed after said first time; and a second detecting unit detecting a second satellite providing said communication service to said specific area at said second time, and wherein said first satellite transmits a hand-over request to perform a hand-over of said specific area to said second satellite, said hand-over request including a connection information with respect to a communication through said first satellite of a first terminal at said specific area, and wherein said second satellite sets a first connection information with respect to a communication between said first satellite and said first terminal to a information with respect to a communication between said second satellite and said first terminal provisionally, said connection information including said first connection information and detects a fourth satellite providing a communication service to a second terminal on the other end of said communication of said first terminal based on said connection information and detects a third satellite positioned between said second satellite and said fourth satellite, and wherein said third satellite provisionally sets a first connection to perform a communication between said second satellite and said third satellite to transmit a provisional setting notification that said first connection is set provisionally to said second satellite, and wherein said second satellite judges whether or not a second connection provided between said third satellite and said fourth satellite is used when said first terminal communicates with said second terminal at said first time and determines said hand-over can be performed when said second satellite receives said provisional setting notification if said second satellite judges said second connection is used to transmit said determining result to said first satellite and wherein said first satellite performs said hand-over based on said determining result, said hand-over being performed with using said first connection information and said first and second connections.

31. A hand-over processing system, comprising:

a first satellite;

a second satellite;

a third satellite, wherein said first, second and third satellites move in a same orbit with each other and each of said first, second and third satellites provides a communication service to a service area having a plurality of areas at a first time;

a first detecting unit detecting, of said plurality of areas of said service area of said first satellite, an area as a first specific area outside a service area to which said first satellite provides said communication service at a second time when a first predetermined time elapsed after said first time; and a second detecting unit detecting said second satellite providing said communication service to said first specific area at said second time, and wherein said first satellite transmits a first hand-over request to perform a first hand-over of said first specific area to said second satellite, and wherein said second satellite judges whether or not said first hand-over can be performed in response to said first hand-over request to generate a first judging result and transmits said first judging result to said first satellite, and wherein said first satellite performs said first hand-over based on said first judging result, and wherein said hand-over processing system, further comprising:

a third detecting unit detecting, of said plurality of areas of said service area of said second satellite, an area as a second specific area outside a service area to which said second satellite provides said communication service at a third time when a second predetermined time elapsed after said first time; and a fourth detecting unit detecting said third satellite providing said communication service to said second specific area at said third time, and wherein said second satellite transmits a second hand-over request to perform a second hand-over of said second specific area to said third satellite, and wherein said third satellite judges whether or not said second hand-over can be performed in response to said second hand-over request to generate a second judging result and transmits said second judging result to said second satellite, and wherein said second satellite performs said second hand-over based on said second judging result and wherein said first and second satellites perform said first and second hand-overs in synchronization with each other.

32. A hand-over processing system according to claim 31, wherein one of said first, second, and third satellites is set as a master satellite, and said master satellite transmits a notify indicating of a perfoming time to perform said first and second hand-overs to ones of said first, second and third satellites other than said master satellite, and wherein said first and second hand-overs are performed at said performing time.

33. A hand-over processing system, comprising:

a first satellite;

a second satellite;

a third satellite, wherein said first, second and third satellites move in a same first orbit with each other and each of said first, second and third satellites provides a communication service to a service area having a plurality of areas at a first time;
a fourth satellite;
a fifth satellite;
a sixth satellite, wherein said fourth, fifth and sixth satellites move in a same second orbit with each other and each of said fourth, fifth and sixth satellites provides a communication service to a service area having a plurality of areas at a second time;
a first detecting unit detecting, of said plurality of areas of said service area of said first satellite, an area as a first specific area outside a service area to which said first satellite provides said communication service at a third time when a first predetermined time elapsed after said first time;
a second detecting unit detecting said second satellite providing said communication service to said first specific area at said third time, and
wherein said first satellite transmits a first hand-over request to perform a first hand-over of said first specific area to said second satellite, and
wherein said second satellite judges whether or not said first hand-over can be performed in response to said first hand-over request to generate a first judging result and transmits said first judging result to said first satellite, and
wherein said first satellite performs said first hand-over based on said first judging result, and
wherein said hand-over processing system, further comprising:
  a third detecting unit detecting, of said plurality of areas of said service area of said second satellite, an area as a second specific area outside a service area to which said second satellite provides said communication service at a fourth time when a second predetermined time elapsed after said first time; and
  a fourth detecting unit detecting said third satellite providing said communication service to said second specific area at said fourth time, and
wherein said second satellite transmits a second hand-over request to perform a second hand-over of said second specific area to said third satellite, and
wherein said third satellite judges whether or not said second hand-over can be performed in response to said second hand-over request to generate a second judging result and transmits said second judging result to said second satellite, and
wherein said second satellite performs said second hand-over based on said second judging result, and
wherein said hand-over processing system, further comprising:
  a fifth detecting unit detecting, of said plurality of areas of said service area of said fourth satellite, an area as a third specific area outside a service area to which said fourth satellite provides said communication service at a fifth time when a third predetermined time elapsed after said second time; and
  a sixth detecting unit detecting said fifth satellite providing said communication service to said third specific area at said fifth time, and
wherein said fourth satellite transmits a third hand-over request to perform a third hand-over of said third specific area to said fifth satellite, and
wherein said fifth satellite judges whether or not said third hand-over can be performed in response to said third hand-over request to generate a third judging result and transmits said third judging result to said fourth satellite, and
wherein said fourth satellite performs said third hand-over based on said third judging result, and
wherein said hand-over processing system, further comprising:
  a seventh detecting unit detecting, of said plurality of areas of said service area of said fifth satellite, an area as a fourth specific area outside a service area to which said fifth satellite provides said communication service at a sixth time when a fourth predetermined time elapsed after said second time; and
  a eighth detecting unit detecting said sixth satellite providing said communication service to said fourth specific area at said sixth time, and
wherein said fifth satellite transmits a fourth hand-over request to perform a fourth hand-over of said fourth specific area to said sixth satellite, and
wherein said sixth satellite judges whether or not said fourth hand-over can be performed in response to said fourth hand-over request to generate a third judging result and transmits said third judging result to said fifth satellite, and
wherein said fifth satellite performs said fourth hand-over based on said third judging result and
wherein said first, second, third and fourth hand-overs are performed in synchronization with each other.

34. A hand-over processing system according to claim 33, wherein one of said first, second and third satellites is set as a network master and one of said fourth, fifth and sixth satellites is set as a non-network master, and
wherein said network master transmits a notify indicating of a performing time to perform said first, second, third and fourth hand-overs to said non-network master, and
wherein said network master transmits said notify to ones of said first, second and third satellites other than said network master, and
wherein said non-network master transmits said notify to ones of said fourth, fifth and sixth satellites other than said non-network master and
wherein said first, second, third and fourth hand-overs are performed at said performing time.

35. A hand-over processing system according to claim 34, wherein each orbit plane of said first and second orbits is one of a first plane of a polar orbit and a second plane having an angle which is slightly inclined from said polar orbit, and
wherein said network master is set to be one moving near the pole of said first, second and third satellites and said non-network master is set to be one moving near the pole of said fourth, fifth and sixth satellites.

36. A hand-over processing system, comprising:
a first satellite providing a communication service to a service area at a first time;
a first detecting unit detecting a specific area outside a service area to which said first satellite provides said communication service at a second time when a predetermined time elapsed after said first time; and
a second detecting unit detecting a second satellite providing said communication service to said specific area at said second time, and
wherein said first satellite transmits a hand-over request to perform a hand-over of a connection of a terminal communicating at said specific area to said second satellite, said hand-over request including a connection information with respect to a communication through said first satellite of a first terminal at said specific area, and wherein said second satellite sets a first connection information with respect to a communication between said first satellite and said first terminal to a information with respect to a communication between said second satellite and said first terminal provisionally, said connection information including said first connection information and detects a fourth satellite providing a communication service to a second terminal on the other end of said communication of said first terminal based on said connection information, and wherein said second satellite judges whether or not said hand-over can be performed in response to said hand-over request to transmit said judging result to said first satellite and wherein said first satellite performs said hand-over based on said judging result.

37. The hand-over processing method of claim 1, further comprising the step, after detecting the fourth satellite, of provisionally setting a second connection to perform a communication between the second satellite and the fourth satellite.

38. The hand-over processing method of claim 37, further comprising the step of transmitting a provisional setting notification that said second connection is set provisionally to said second satellite after provisionally setting the second connection.

39. The hand-over processing method of claim 38, wherein the step of judging whether in the judging step, it is determined that the hand-over can be performed when the provisional setting notification is transmitted to transmit the judging result to the first satellite.

40. The hand-over processing method of claim 18, further comprising the step, after detecting the fourth satellite, of provisionally setting a second connection to perform a communication between the second satellite and the fourth satellite.

41. The hand-over processing method of claim 40, further comprising the step of transmitting a provisional setting notification that said second connection is set provisionally to said second satellite after provisionally setting the second connection.

42. The hand-over processing method of claim 41, wherein the step of judging whether in the judging step, it is determined that the hand-over can be performed when the provisional setting notification is transmitted to transmit the judging result to the first satellite.

43. The hand-over processing system of claim 19, wherein the fourth satellite provisionally sets a second connection to perform a communication between the second satellite and the fourth satellite and transmits a provisional setting notification that the second connection is set provisionally to the second satellite.

44. The hand-over processing system of claim 43, wherein the second satellite determines that the hand-over can be performed when the provisional setting notification is transmitted to transmit the judging result to the first satellite.

45. The hand-over processing system of claim 36, wherein the fourth satellite provisionally sets a second connection to perform a communication between the second satellite and the fourth satellite and transmits a provisional setting notification that the second connection is set provisionally to the second satellite.

46. The hand-over processing system of claim 45, wherein the second satellite determines that the hand-over can be performed when the provisional setting notification is transmitted to transmit the judging result to the first satellite.

* * * * *